United States Patent [19]

Salazar et al.

[11] Patent Number: 4,665,353
[45] Date of Patent: May 12, 1987

[54] MICROPROCESSOR CONTROLLED D.C. MOTOR FOR CONTROLLING TAPE FEEDING MEANS

[75] Inventors: Edilberto I. Salazar, Brookfield; Wallace Kirschner, Trumbull, both of Conn.

[73] Assignee: Pitney Bowes Inc., Stamford, Conn.

[21] Appl. No.: 657,552

[22] Filed: Oct. 4, 1984

[51] Int. Cl.$^4$ ............................................. G05B 11/28
[52] U.S. Cl. ..................................... 318/599; 318/632; 318/633
[58] Field of Search ............... 318/314, 341, 599, 601, 318/603, 618, 619, 622, 632, 636, 653; 360/78

[56] References Cited

U.S. PATENT DOCUMENTS

| | | | |
|---|---|---|---|
| 3,354,371 | 11/1967 | Ainsworth | 318/341 |
| 3,621,354 | 11/1971 | Fawcett | 318/341 |
| 4,016,467 | 4/1977 | Hallenbeck | 318/604 |
| 4,023,489 | 5/1977 | Beery | 101/235 |
| 4,156,170 | 5/1979 | Strunc | 318/696 |
| 4,226,546 | 10/1980 | Hoffman | 400/144.2 |
| 4,234,830 | 11/1980 | Cannon | 318/39 |
| 4,250,544 | 2/1981 | Alley | 364/110 |
| 4,340,848 | 7/1982 | Hanagata | 318/561 |
| 4,412,165 | 10/1983 | Case | 318/636 |

Primary Examiner—William M. Shoop, Jr.
Assistant Examiner—Saul M. Bergmann
Attorney, Agent, or Firm—Donald P. Walker; Melvin J. Scolnick; David E. Pitchenik

[57] ABSTRACT

In a machine which includes apparatus for feeding tape and for driving the tape feeding apparatus, there is provided an improvement for controlling the tape feeding apparatus. The improvement comprises the driving apparatus is provided with a d.c. motor having an output shaft for driving the tape feeding apparatus, and apparatus is provided for sensing angular displacement of the motor output shaft. In addition there is provided a microcomputer including a microprocessor comprising a clock for generating successive sampling time periods, structure for providing first counts respectively representative of successive desired angular displacements of the motor output shaft during successive sampling time periods, structure responsive to the sensing apparatus for providing second counts respectively representative of actual angular displacements of the motor output shaft during successive sampling time periods, and structure for compensating for the difference between the first and second counts during each successive sampling time period and generating a pulse width modulated control signal for controlling the d.c. motor, the motor control signal causing the actual angular displacement of the motor output shaft to substantially match the desired angular displacement of the motor output shaft during successive sampling time periods. Further, a signal amplifier circuit is provided for operably coupling the motor control signal to the d.c. motor.

26 Claims, 31 Drawing Figures

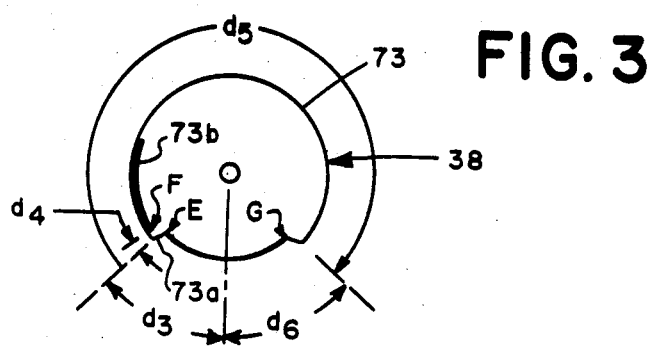
FIG. 3
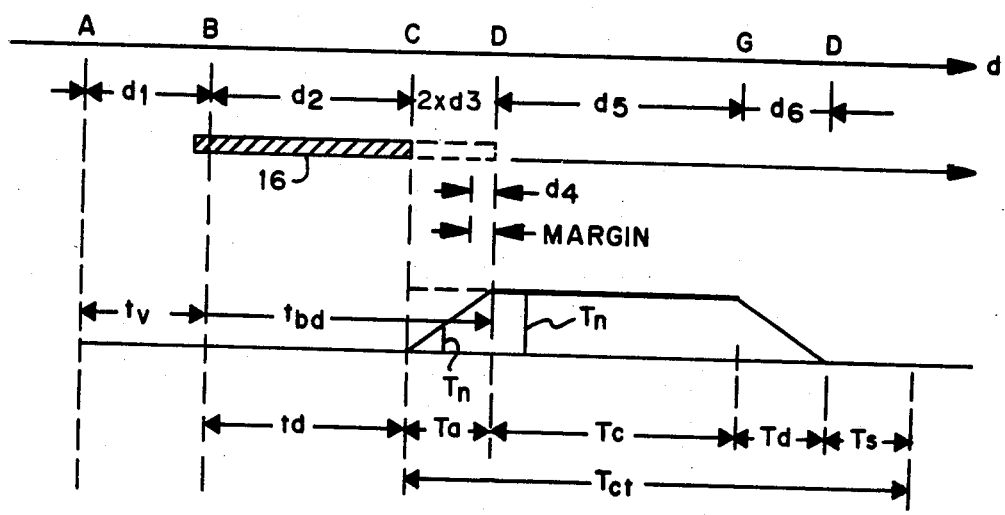
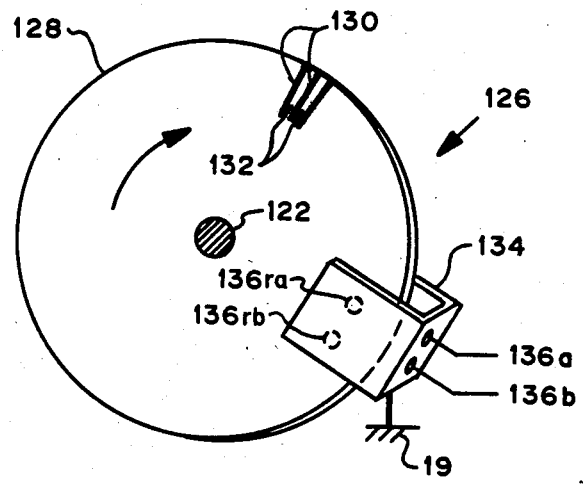
FIG. 4

| MOTOR ROTATION | Q1 | Q2 | Q3 | Q4 | T1 | T2 | T3 | T4 | A | B | C | D | 302 | 304 |
|---|---|---|---|---|---|---|---|---|---|---|---|---|---|---|
| CW | ON | OFF | OFF | ON | ON | OFF | OFF | ON | HIGH | LOW | LOW | HIGH | + | − |
| CCW | OFF | ON | ON | OFF | OFF | ON | ON | OFF | LOW | HIGH | HIGH | LOW | − | + |

FIG. 12

(a) $\quad H_1(S) = ZOH\,(K_v)(K_a)\dfrac{K_m}{s\left(\frac{S}{f_1}+1\right)\left(\frac{S}{f_2}+1\right)}K_p$ (b) $\quad H_2(S) = ZOH\,(K_v)(K_a)\dfrac{K_m}{s\left(\frac{S}{f_1}+1\right)\left(\frac{S}{f_2}+1\right)}(K_p)(K_c)$ $\qquad = \dfrac{e^{S\frac{T}{2}}(K_v)(K_a)(K_m)(K_p)(K_c)}{s\left(\frac{S}{f_1}+1\right)\left(\frac{S}{f_2}+1\right)}$ $\qquad = \dfrac{K_0\, e^{S\frac{T}{2}}}{s\left(\frac{S}{f_1}+1\right)\left(\frac{S}{f_2}+1\right)} = \dfrac{400\, e^{-0.001\frac{S}{2}}}{s\left(\frac{S}{48}+1\right)\left(\frac{S}{733}+1\right)}$

FIG. 13

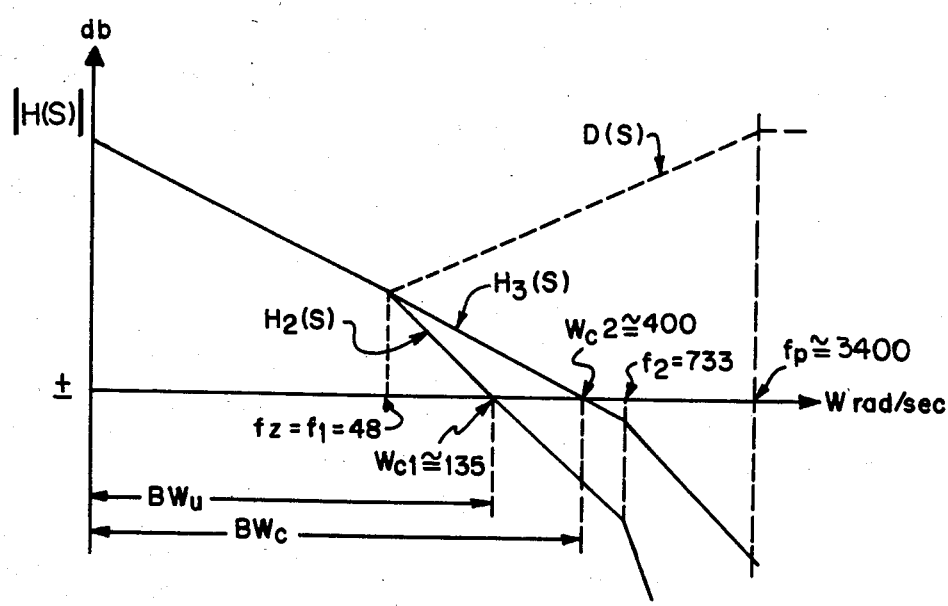

FIG. 14

$$D(S) = K_c \frac{\left(\frac{S}{f_z}+1\right)}{\left(\frac{S}{f_p}+1\right)}$$

$$= 13.64 \frac{\frac{S}{48}+1}{\frac{S}{3400}+1} = 966 \frac{(S+48)}{(S+3400)}$$

FIG. 15

(a) $d_f = \Theta_m \frac{\pi}{360°}$ (b) $O_S = 100 \frac{e^{\frac{\pi}{d_f}}}{\sqrt{1-d_f^2}}$ (c) $t_x = \frac{1}{d_f}(W_n) \approx \frac{1}{d_f}(W_c)$ (d) $t_s \approx 5 t_x$

FIG. 16

$$S = \frac{2}{T} \times \frac{Z-1}{Z+1}$$

FIG. 17

$$D(Z) \approx 366 \left( \frac{Z - 0.953}{Z + 0.259} \right)$$

$$= 366 \left( \frac{1 - 0.953 Z^{-1}}{1 + 0.259 Z^{-1}} \right)$$

FIG. 18

(a) $D(Z) = \dfrac{G(Z)}{E(Z)} = 366 \left( \dfrac{1 - 0.953 Z^{-1}}{1 + 0.259 Z^{-1}} \right)$ (b) $G(Z) = 366 E(Z) - 348 E(Z) Z^{-1} - 0.259 G(Z) Z^{-1}$

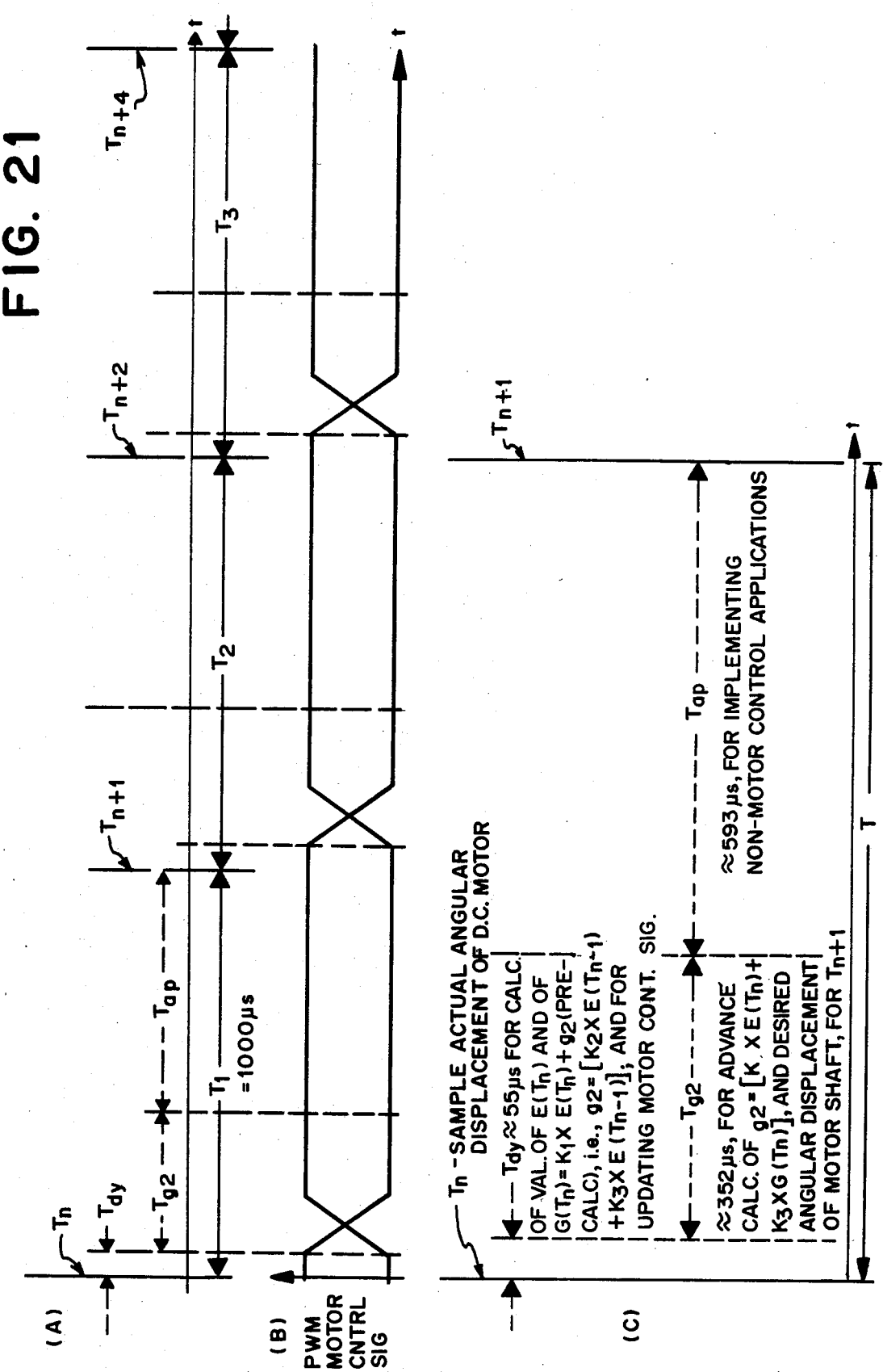

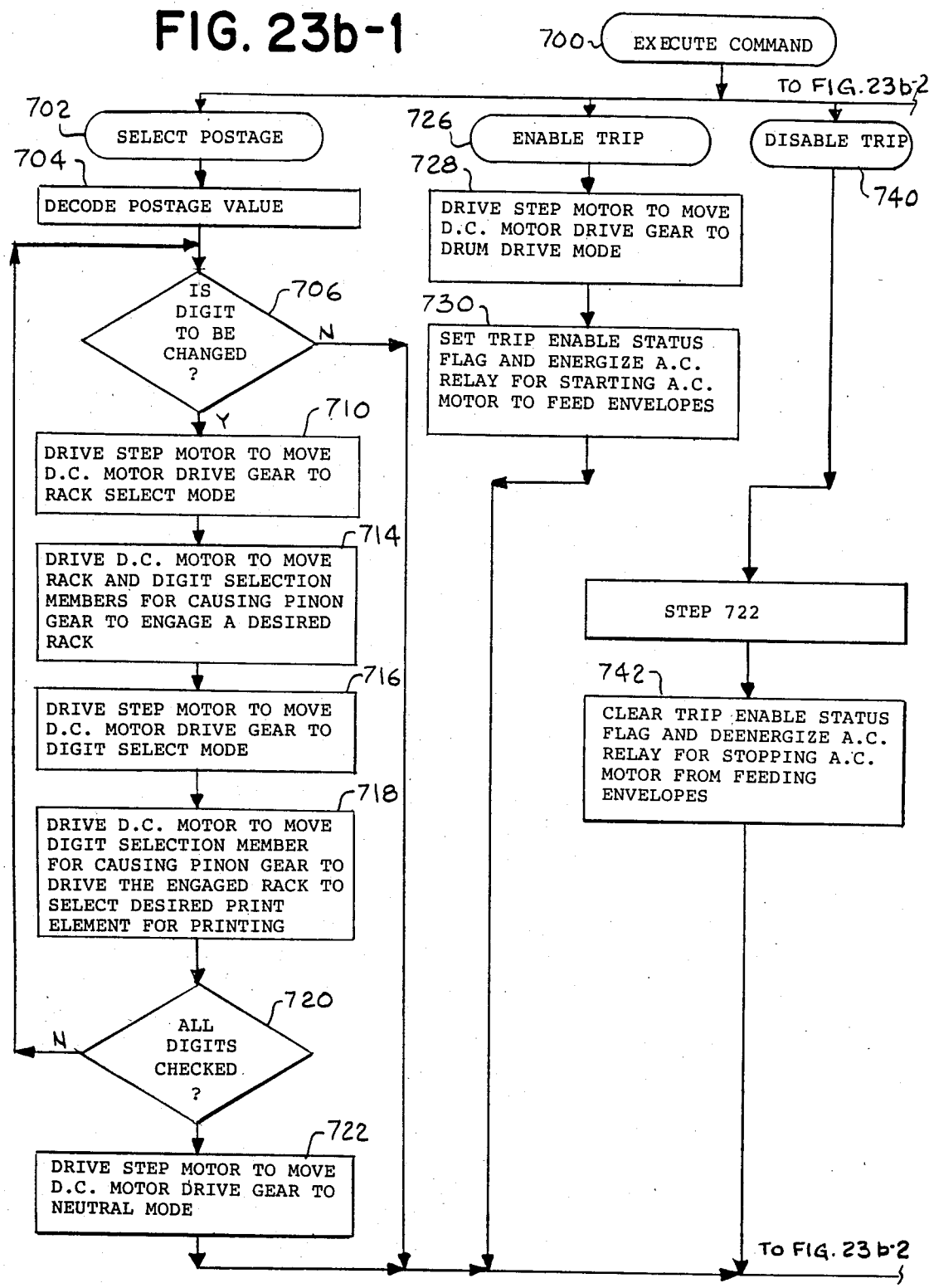

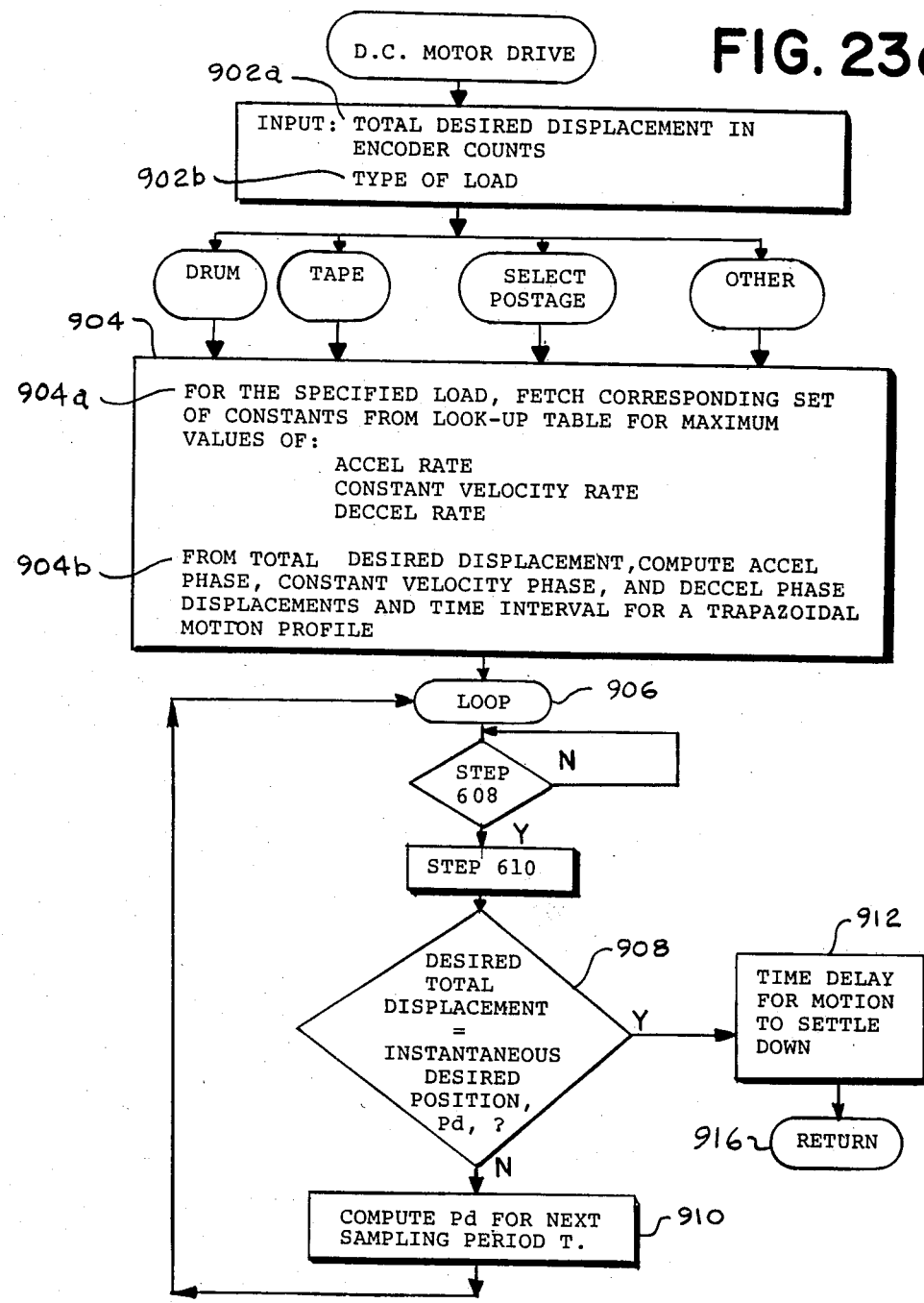

MICROPROCESSOR CONTROLLED D.C. MOTOR FOR CONTROLLING TAPE FEEDING MEANS

BACKGROUND OF THE INVENTION

The present invention is generally concerned with tape feeding apparatus, for example, of the type used in postage meters and mailing machines, and more particularly with improvements for controlling such apparatus by means of a microcomputer controlled d.c. motor.

In U.S. Pat. No. 4,287,825 issued Sept. 8, 1981 to Eckert, et al and assigned to the assignee of the present there is disclosed a microcomputer controlled postage meter including a postage value selection mechanism for selecting postage values which are to be printed by a rotary postage printing drum, on a letter or length of tape attachable to a letter, parcel or the like. The drive shaft of the drum includes a plurality of selectable racks, each of which is slidably movable in engagement with a print wheel within the drum for selectively rotating the print wheel for disposing one of its print elements at the outer periphery of the drum for printing purposes. The value selection mechanism includes a first stepper motor which is operable for selecting the respective racks, and a second stepper motor which is operable for actuating the selected rack for selectively rotating its associated print wheel. The microcomputer, which is coupled to the keyboard for processing postage value entries by an operator, selectively drives the respective stepper motors in response to keyboard entries.

In U.S. Pat. No. 2,934,009 issued Apr. 26, 1960 to Bach, et al and assigned to the assignee of the present invention there is described a postage meter which includes a drive mechanism comprising a single revolution clutch and a drive train for connecting the clutch to the postage meter drum. The clutch rotates the drum from a home position and into engagement with a letter fed to the drum. And the drum prints the pre-selected postage value on the letter while feeding the same downstream beneath the drum as the drum returns to the home position. Each revolution of the single revolution clutch and thus the drum, is initiated by the letter engaging a trip lever to release the helical spring of the single revolution clutch. The velocity versus time profile of the periphery of the drum approximates a trapezoidal configuration, having acceleration, constant velocity and deceleration portions, fixed by the particular clutch and drive train used in the application. This being the case, the throughput rate of any mailing machine associated with the meter is dictated by the cycling speed of the postage meter rather than by the speed with which the individual mailpieces are fed to the postage meter. Further, although the single revolution clutch structure has served as the workhorse of the industry for many years it has long been recognized that it is a complex mechanism which is relatively expensive to construct and maintain, does not precisely follow the ideal trapezoidal velocity vs. time motion profile which is preferred for drum motion, tends to be unreliable in high volume applications, and is noisy and thus irritating to customers. Accordingly:

An object of the invention is to replace the value selection mechanism of the prior art with a rotary value selection mechanism, having rotary rack selection means and rotary print element selection means, a stepper motor which selectively engages the respective rack and print element selection means, a D.C. motor, and a computer, wherein the computer is programmed for controlling the stepper motor to alternately select the rack or print element selection means, and for controlling the D.C. motor to drive the selected selection means in accordance with data representative of a desired trapezoidal-shaped velocity versus time profile;

Another object is to provide a D.C. motor, adapted to be coupled to any one of a plurality of loads, which is controlled by a computer which is programmed for driving the respective loads in accordance with various desired trapezoidal-shaped velocity versus time profiles of angular displacement of the motor shaft which are each representative of a desired linear displacement versus time profile of motion of a portion of a load;

Another object of the invention is to replace the postage meter drum drive mechanism of the prior art with the combination of a D.C. motor and a computer, and program the computer for causing the D.C. motor to drive the drum in accordance with an ideal trapezoidal-shaped velocity versus time profile which is a function of the input velocity of a mailpiece; and Another object is to replace the trip lever as the drive initiating device and utilize in its place a pair of spaced apart sensing devices in the path of travel of a mailpiece fed to the postage meter, and program the computer to calculate the input velocity of a mailpiece, based upon the time taken for the mailpiece to traverse the distance between the sensing devices, and adjust both the time delay before commencing acceleration of the drum and the drum's acceleration, to cause the drum to timely engage the leading edge of the mailpiece; and Another object is to provide an improvement for controlling tape feeding apparatus, for example, of the type used in combination with a postage meter or mailing machine, including a microcomputer controlled d.c. motor coupled to the tape feeding apparatus.

SUMMARY OF THE INVENTION

In a machine including tape feeding means, and means for driving the tape feeding means, an improvement for controlling the tape feeding means, the improvement comprising the driving means including a d.c. motor having an output shaft for driving the tape feeding means; means for sensing angular displacement of the motor output shaft; microcomputer means including a microprocessor comprising clock means for generating successive sampling time periods, means for providing first counts respectively representative of successive desired angular displacements of the motor output shaft during successive sampling time periods, means responsive to the sensing means for providing second counts respectively representative of actual angular displacements of the motor output shaft during successive sampling time periods, and means for compensating for tne difference between the first and second counts during each successive sampling time period and generating a pulse width modulated control signal for controlling the d.c. motor, the motor control signal causing the actual angular displacement of the motor output shaft to substantially match the desired angular displacement of the motor output shaft during successive sampling time periods; and signal amplifying means for operably coupling the motor control signal to the d.c. motor.

BRIEF DESCRIPTION OF THE DRAWINGS

As shown in the drawings wherein like reference numerals designate like or corresponding parts throughout the several views:

FIG. 3 shows the relationship between the position of a sheet and the postage meter drum as a function of time, and an ideal velocity versus time profile of the periphery of the drum;

FIG. 4 is a perspective view of the quadrature encoder mounted on a D.C. motor drive shaft;

FIG. 12 shows the equations for calculating the overall gain of the closed loop servo system of FIG. 10 before (FIG. 2a) and after (FIG. 2b) including a gain factor corresponding to the system friction at motor start up;

FIG. 13 is a bode diagram including plots for the closed loop servo system before and after compensation to provide for system stability and maximization of the system's bandwidth;

FIG. 14 shows the equation for calculating, in the frequency domain the value of the system compensator;

FIG. 15 shows the equation for calculating the damping factor, overshoot and settling time of the servo controlled system;

FIG. 16 shows the equation for the laplace operator expressed in terms of the Z-transform operator;

FIG. 17 shows the equation for calculating the value of the system compensator in the position domain;

FIG. 18 shows the equations for converting the system compensator of FIG. 17 to the position domain;

FIG. 19 shows the equation of the output of the system compensator in the time domain;

FIGS. 21, 21a, 21b and 21c show the time intervals during which the motor control signal and its separable components are calculated to permit early application of the signal to the motor;

FIGS. 22, 22a and 22b are block diagrams of the computer according to the invention.

DESCRIPTION OF THE PREFERRED EMBODIMENTS

Figure 1:
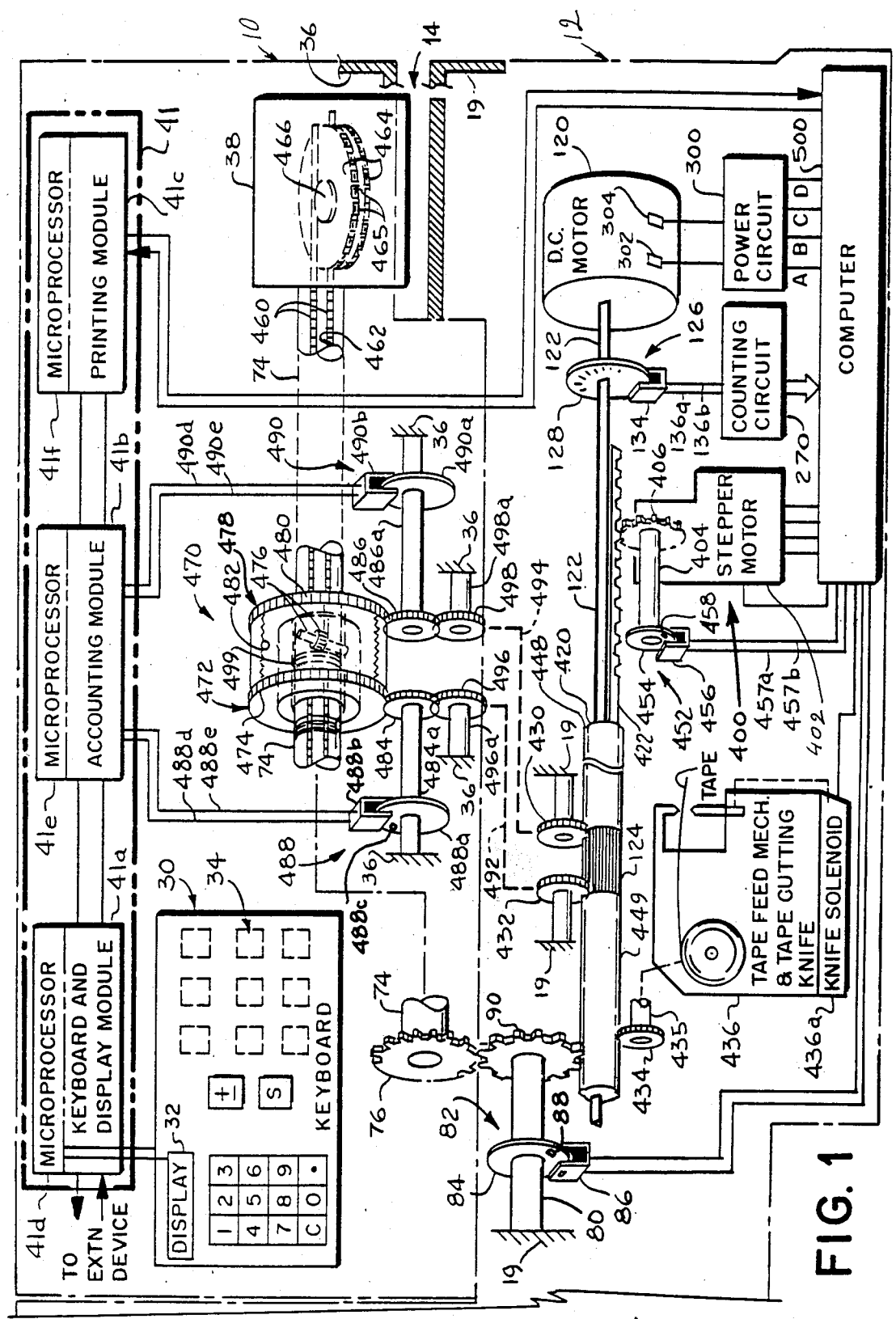
FIG. 1 is a schematic view of a postage meter mounted on mailing machine in accordance with the invention.

As shown in FIG. 1, the apparatus in which the invention may be incorporated generally includes an electronic postage meter 10 which is suitably removably mounted on a conventional mailing machine 12, so as to form therewith a slot 14 (FIG. 2) through which sheets, including mailpieces 16, such as envelopes, cards or other sheet-like materials, may be fed in a downstream path of travel 18.

The postage meter 10 (FIG. 1) includes a keyboard 30 and display 32. The keyboard 30 includes a plurality of numeric keys, labeled 0-9 inclusive, a clear key, labeled "c" and a decimal point key, labeled ".", for selecting postage values to be entered; a set postage key, labeled "s", for entering selected postage values; and an arithmetic function key, labeled "$\pm$", for adding subsequently selected charges (such as special delivery costs) to a previously selected postage value before entry of the total value. In addition, there is provided a plurality of display keys, designated 34, each of which are provided with labels well known in the art for identifying information stored in the meter 10, and shown on the display 32 in response to depression of the particular key 34, such as the "postage used", "postage unused", "control sum", "piece count", "batch value" and "batch count" values. A more detailed description of the keys of the keyboard 30 and the display 32, and their respective functions may be found in U.S. Pat. No. 4,283,721 issued Aug. 11, 1981 to Eckert, et al. and assigned to the assignee of the present invention.

In addition, the meter 10 (FIG. 1) includes a casing 36, on which the keyboard 30 and display 32 are conventionally mounted, and which is adapted by well known means for carrying a cyclically operable, rotary, postage printing drum 38. The drum 38 (FIG. 2) is conventionally constructed and arranged for feeding the respective mailpieces 16 in the path of travel 18, which extends beneath the drum 38, and for printing entered postage on the upwardly disposed surface of each mailpiece 16.

The postage meter 10 (FIG. 1) additionally includes a computer 41 which is conventionally electrically connected to the keyboard 30 and display 32. The computer 41 generally comprises a conventional, microcomputer system having a plurality of microcomputer modules including a control or keyboard and display module, 41a, an accounting module 41b and a printing module 41c. The control module 41a is both operably electrically connected to the accounting module 41b and adapted to be operably electrically connected to an external device via respective two-way serial communications channels, and the accounting module 41b is operably electrically connected to the printing module 41c via a corresponding two-way serial communication channel. In general, each of the modules 41a, 41b and 41c includes a dedicated microprocessor 41d, 41e or 41f, respectively, having a separately controlled clock and programs. And twoway communications are conducted via the respective serial communication channels utilizing the echoplex communication discipline, wherein communications are in the form of serially transmitted single byte header-only messages, consisting of ten bits including a start bit followed by an 8 bit byte which is in turn followed by a stop bit, or in the form of a multi-byte message consisting of a header and one or more additional bytes of information. Further, all transmitted messages are followed by a no error pulse if the message was received error free. In operation, each of the modules 41a, 41b and 41c is capable of processing data independently and asynchronously of the other. In addition, to allow for compatibility between the postage meter 10 and any external apparatus, all operational data transmitted to, from and between each of the three modules 41a, 41b and 41c, and all stored operator information, is accessible to the external device via the two-way communication channel, as a result of which the external apparatus (if any) may be adapted to have complete control of the postage meter 10 as well as access to all current operational information in the postage meter 10. In addition, the flow of messages to, from and between the three internal modules 41a, 41b and 41c is in a predetermined, hierarchical direction. For example, any command message from the control module 41a is communicated to the accounting module 41b, where it is processed either for local action in the accounting module 41b and/or as a command message for the printing module 41c. On the other hand, any message from the printing module 41c is communicated to the accounting module 41b where it is either used as internal information or merged with additional data and communicated to the control module 41c. And, any message from the accounting module 41b is initially directed to the printing module 41c or to the control module 41a. A more detailed description of the various prior art modules 41a, 41b and 41c, and various modifications thereof, may be found in U.S. Pat. Nos. 4,280,180; 4,280,179; 4,283,721 and 4,301,507; each of which patents is assigned to the assignee of the present invention.

The mailing machine 12 (FIG. 2), which has a casing 19, includes a A.C. power supply 20 which is adapted by means of a power line 22 to be connected to a local source of supply of A.C. power via a normally open main power switch 24 which may be closed by the operator. Upon such closure, the mailing machine's D.C. power supply 26 is energized via the power line 28. In addition, the mailing machine 12 includes a conventional belt-type conveyor 49, driven by an A.C. motor 50, which is connected for energization from the A.C. power supply 20 via a conventional, normally open solid state, A.C. motor, relay 52. Further, the mailing machine 12 includes a computer 500 which is conventionally programmed for timely operating the relay 52 to close and open the relay 52. Upon such closure the A.C. motor 50 drives the conveyor 49 for feeding mailpieces 16 to the drum 38. To facilitate operator control of the switch 24, the mailing machine preferably includes a keyboard 53 having a "start" key 53a and a "stop" key 53b, which are conventionally coupled to the main power switch 24 to permit the operator to selectively close and open the switch 24. In addition, the keyboard 53 preferably includes a tape key 53c, which is conventionally coupled to the computer 500 to permit the operator to selectively cause the computer 500 to commence controlling operation of the conventional tape feeding mechanism hereinafter discussed. And other keys of the keyboard, shown by the dashed lines, may be conventionally coupled to the computer to permit the operator to selectively cause the computer 500 to initiate and control the operation of other conventional apparatus of the mailing machine 12. Assuming the computer 500 has timely closed the relay 52, the A.C. motor 50 is energized from the A.C. power supply 20. Whereupon the conveyor 49 transports the individual mailpieces 16, at a velocity corresponding to the angular velocity of the motor 50, in the path of travel 18 to the postage printing platen 54.

According to the invention, the machine 12 includes first and second sensing devices respectively designated 56 and 58, which are spaced apart from each other a predetermined distance $d_1$, i.e., the distance between points A and B in the path of travel 18. Preferably, each of the sensing devices 56 and 58, is an electro-optical device which is suitably electrically coupled to the computer 500; sensing device 56 being connected via communication line 60 and sensing device 58 being connected via communication line 62. The sensing devices 56, 58 respectively respond to the arrival of a mailpiece 16 at points A and B by providing a signal to the computer 500 on communication line 60 from sensing device 56 and on communication line 62 from sensing device 58. Thus, the rate of movement or velocity V1 of any mailpiece 16 may be calculated by counting the elapsed time $t_v$ (FIG. 3) between arrivals of the mailpiece 16 at points A and B, and dividing the distance $d_1$, by the elapsed time tv. To that end, the computer 500 is programmed for continuously polling the communications lines 60 and 62 each time instant $T_n$ at the end of a predetermined sampling time period, T, preferably T=1 millisecond, and to commence counting the number of time instants $T_n$ when the leading edge of a given mailpiece 16 is detected at point A, as evidenced by a transition signal on communication line 60, and to end counting the time instants $T_n$ when the given mailpiece 16 is detected at point B, as evidenced by a transition signal on communication line 62. Since the distance $d_1$, is a mechanical constant of the mailing machine 12, the velocity of the mailpiece may be expressed in terms of the total number $N_t$ cf time instants $T_n$ which elapse as the given mailpiece traverses the distance $d_1$. For example, assuming a maximum velocity of 61 inches per second, $d_1 = 2.75$ inches and T=1 millisecond; the total number $N_t$ of elapsed time instants $T_n$ may be found by dividing $d_1 = 2.75$ inches by V1=61 inches per second to obtain $N_t=45$, i.e., the total number of time instants $T_n$ which elapse between arrivals of the mailpiece at points A and B. Thus, the number $N_t=45$ corresponds to and is representative of a mailpiece velocity of V1=61 inches per second.

Assuming normal operation of the transport system and calculation of the value of V1 having been made, the time delay $t_d$ (FIG. 3) before arrival of the mailpiece 16 at point C may be calculated by dividing the distance $d_2$ between points B and C by the mailpiece's velocity V1, provided the distance $d_2$ is known. Since the integral of the initial, triangularly-shaped, portion of the velocity versus time profile is equal to one-half of the value of the product of $T_a$ and $V_1$, and is equal to the arc $d_3$ described by point E on the drum 38, as the drum 38 is rotated counter-clockwise to point D, the distance between points C and D is equal to twice the arcuate distance $d_3$. Accordingly, $d_2$ may be conventionally calculated, as may be the time delay $t_d$ for the maximum throughput velocity. Assuming rotation of the drum 38 is commenced at the end of the time delay $t_d$ and the drum 38 is linearly accelerated to the velocity V1 to match that of the mailpiece 16 in the time interval $T_a$ during which point E on the drum 38 arcuately traverses the distance $d_3$ to point D, Ta may be conventionally calculated. In addition, assuming commencement of rotation at the end of the time delay $t_d$ and that the drum 38 is linearly accelerated to the velocity V1 during the time interval Ta, the mailpiece 16 will arrive at point D coincident with the rotation of point E of the outer periphery 73 of the drum 38 to point D, with the result that the leading edge 73a of the drum's outer periphery 73, which edge 73a extends transverse to the path of travel 18 of the mailpiece 16, will engage substantially the leading edge of the mailpiece for feeding purposes and the indicia printing portion 73b of the periphery 73 will be marginally spaced from the leading edge of the mailpiece 16 by a distance $d_4$ which is equal to the circumferential distance between points E and F on the drum 38. Since the circumferential distance $d_5$ on the drum 38 between points E and G is fixed, the time interval Tc during which the drum 38 is rotated at the constant velocity V1 may also be calculated When point G on the drum 38 is rotated out of engagement with the mailpiece 16, the drum 38 commences deceleration and continues to decelerate to rest during the time interval Td. The distance $d_6$ which is traversed by point G, as the drum 38 is rotated to return point E to its original position of being spaced a distance $d_3$ from point D, is fixed, and, Td may be chosen to provide a suitable deceleration rate for the drum, preferably less than Ta. In addition, a reasonable settling time interval Ts is preferably added to obtain the overall cycling time Tct of the drum 38 to allow for damping any overshoot of the drum 38 before commencing the next drum cycle. For a typical maximum drum cycle time period Tct of 234 milliseconds and a maximum mailpiece transport rate of 61 inches per second, typical values for the acceleration, constant velocity, deceleration and settling time intervals are Ta=37 milliseconds, Tc=124 milliseconds, Td=24 milliseconds and Ts=234-185=49 milliseconds. Utilizing these values, the required acceleration and deceleration values for the drum 38 during the time intervals Ta and Td may be conventionally calculated. In addition, since the integral of the velocity versus time profile is equal to the distance traversed by the circumference of the drum 38 during a single revolution of the drum 38, the desired position of the drum 38 at the end of any sampling time period of T=1 millisecond may be calculated. For target velocities V1 which are less than the maximum throughput velocity, it is preferably assumed that integral of, and thus the area under, the velocity versus time profile remains constant, and equal to the area thereof at the maximum throughput velocity, to facilitate conventional calculation of the values of the time delay $t_d$, the time intervals Ta, Tc and Td, and the acceleration and deceleration values for each of such lesser velocities V1.

For computer implementation purposes, the computer 500 is programmed to continously poll the communication lines 60 and 62, from the sensing devices 56 and 58, respectively, each time interval $T_n$, and count the time intervals $T_n$ between arrivals of the mailpiece 16 at points A and B as evidenced by a transition signals on lines 60 or 62. Further, the computer 500 is programmed to calculate the current velocity of the mailpiece 16 in terms of the total number $N_t$ of the counted time intervals $T_n$, store the current velocity and, preferably, take an average of that velocity and at least the next previously calculated velocity (if any) to establish the target velocity V1. In addition, it is preferable that precalculated values for the time delay td, acceleration and deceleration corresponding to each of a plurality of target velocities be stored in the memory of the computer 500 for fetching as needed after calculation of the particular target velocity. In this connection it is noted that the velocity at any time "t" of the drum 38 may be expressed by adding to the original velocity $V_o$ each successive increment of the product of the acceleration and time during each time period of T=1 millisecond, each successive increment of constant velocity and each successive increment of the product of the decceleration and time during each time period T. Preferably, the acceleration and decceleration values are each stored in the form of an amount corresponding to a predetermined number of counts per millisecond square which are a function of the actual acceleration or decceleration value, as the case may be, and of the scale factor hereinafter discussed in connection with measuring the actual angular displacement of the motor drive shaft 122; whereby the computer 500 may timely calculate the desired angular displacement of the motor drive shaft 122 during any sampling time interval T. In this connection it is noted that the summation of all such counts is representative of the desired linear displacement of the circumference of the drum 38, and thus of the desired velocity versus time profile of drum rotation for timely accelerating the drum 38 to the target velocity V1, maintaining the drum velocity at V1 for feeding the particular mailpiece 16 and timely deccelerating the drum 38 to rest.

The postage meter 10 (FIG. 1) additionally includes a conventional, rotatably mounted, shaft 74 on which the drum 38 is fixedly mounted, and a conventional drive gear 76, which is fixedly attached to the shaft for rotation of the shaft 74.

According to the invention, the mailing machine 12 (FIG. 1) includes an idler shaft 80 which is conventionally journaled to the casing 19 for rotation, and, operably coupled to the shaft 80, a conventional home position encoder 82. The encoder 82 includes a conventional circularly-shaped disc 84, which is fixedly attached to the shaft 80 for rotation therewith, and an optical sensing device 86, which is operably coupled to the disc 84 for detecting an opening 88 formed therein and, upon such detection, signalling the computer 500. The machine 12, also includes an idler gear 90 which is fixedly attached to the shaft 80 for rotation therewith. Further, the machine 12 includes a D.C. motor 120, which is suitably attached to the casing 19 and has a drive shaft 122. The machine 12 also includes a pinion gear 124, which is preferably slidably attached to the drive shaft 122 for rotation by the shaft 122. As hereinafter discussed in greater detail, the gear 124 may be slidably disposed in driving engagement with the idler gear 90. Assuming such engagement, rotation of the motor drive shaft 122 in a given direction, results in the same direction of rotation of the drum drive shaft 76 and thus the drum 38. Preferably, the pinion gear 124 has one-fifth the number of teeth as the drum drive gear 76, whereas the idler gear 90 and drum drive gear 76 each have the same number of teeth. With this arrangement, five complete revolutions of the motor drive shaft 122 effectuate one complete revolution of the drum 38, whereas each revolution of the gear 90 results in one revolution of the gear 76. Since there is a one-to-one relationship between revolutions, and thus incremental angular displacements, of the drum shaft 74 and idler shaft 90, the encoder disc 84 may be mounted on the idler shaft 90 such that the disc's opening 88 is aligned with the sensing device 86 when the drum 38 is disposed in its home position to provide for detection of the home position of the drum shaft 74, and thus a position of the drum shaft 74 from which incremental angular displacements may be counted.

Figure 2:
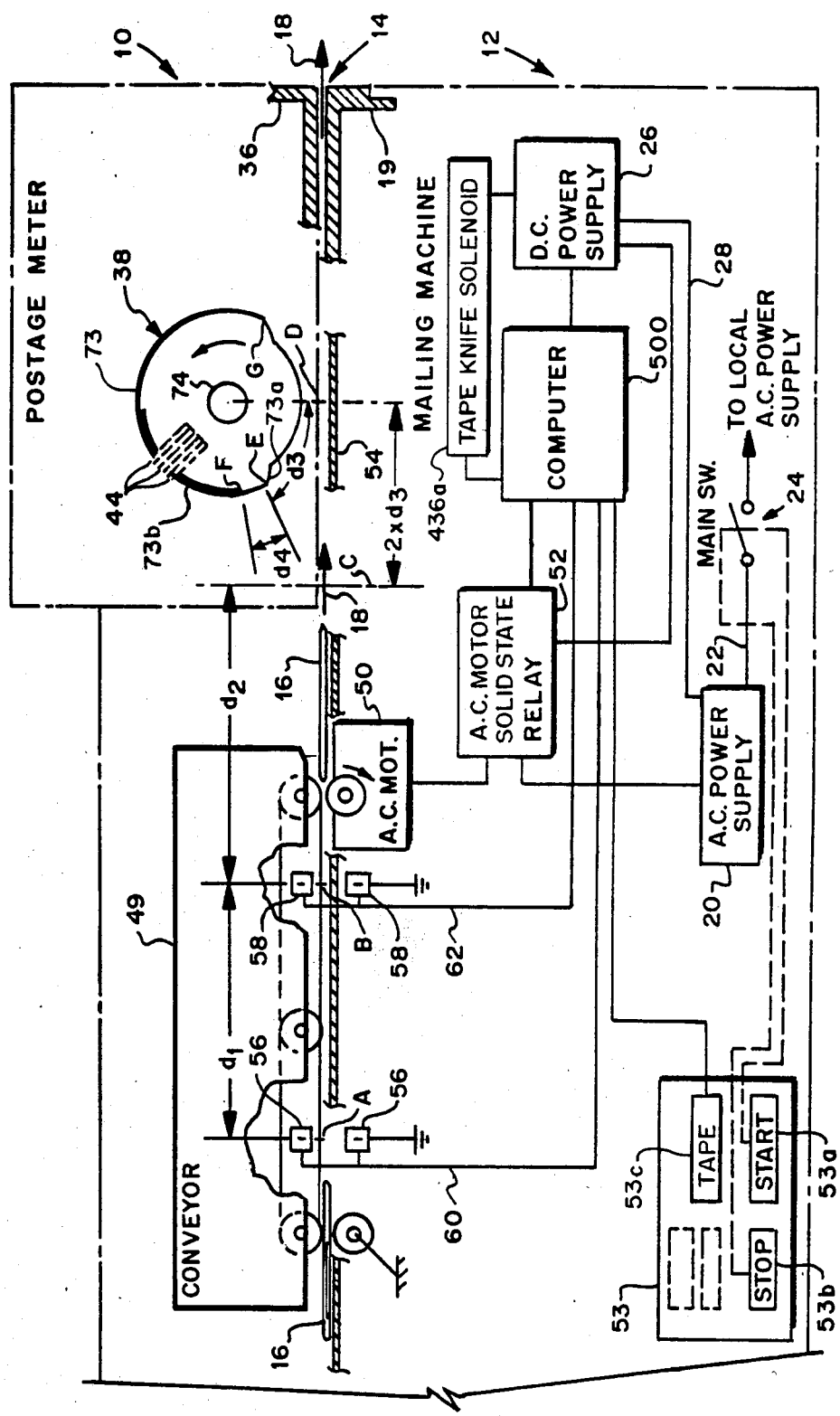
FIG. 2 is a schematic view of the mailing machine of FIG. 1, showing the location of the mailpiece sensors relative to the postage meter drum.
Figure 5:
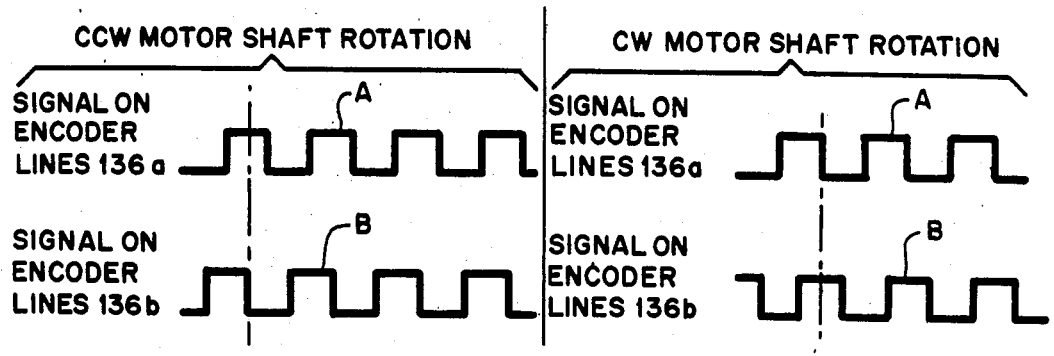
FIG. 5 shows the output signals from the quadrature encoder of FIG. 4 for clockwise and counter-clockwise rotation of the D.C. motor drive shaft.

For sensing actual incremental angular displacements of the motor drive shaft 122 (FIG. 1) from a home position, and thus incremental angular displacements of the drum 38 from its rest or home position as shown in FIG. 2, there is provided a quadrature encoder 126 (FIG. 1). The encoder 126 is preferably coupled to the motor drive shaft 122, rather than to the drum shaft 74, for providing higher mechanical stiffness between the armature of the d.c. motor 120 and the encoder 126 to avoid torsional resonance effects in the system, and to provide for utilization of a single encoder 126 for indirectly sensing the angular displacement and direction of rotation of the shaft 122 for a plurality of different loads. The encoder 126 includes a circularly-shaped disc 128, which is fixedly attached to the motor drive shaft 122 for operably connecting the encoder 126 to the motor 120. The disc 128 (FIG. 4) which is otherwise transparent to light, has a plurality of opaque lines 130 which are formed on the disc 128 at predetermined, equidistantly angularly-spaced, intervals along at least one of the dics's opposed major surfaces. Preferably the disc 128 includes one hundred and ninety-two lines 130 separated by a like number of transparent spaces 132. In addition, the encoder 126 includes an optical sensing device 134, which is conventionally attached to the casing 19 and disposed in operating relationship with respect to the disc 128, for serially detecting the presence of the respective opaque lines 130 as they successively pass two reference positions, for example, positions 136ra and 136rb, and for responding to such detection by providing two output signals, one on each of communications lines 136a and 136b, such as signal A (FIG. 5) on line 136a and signal B on line 136b. Since the disc 128 (FIG. 4) includes 192 lines 130 and the gear ratio of the drum drive gear 76 (FIG. 1) to the motor pinion gear 124 is five-to-one, nine hundred and sixty signals A and B (FIG. 5) are provided on each of the communications lines 136a and 136b during five revolutions of the motor drive shaft 122, and thus, during each cycle of rotation of the drum 38. Since the angular distance between successive lines 130 (FIG. 4) is a constant, the time interval between successive leading edges (FIG. 5) of each signal A and B is inversely proportional to the actual velocity of rotation of the motor drive shaft (FIG. 1) and thus of the drum 38. The encoder 126 is conventionally constructed and arranged such that the respective reference positions 136a and 136b (FIG. 4) are located with respect to the spacing between line 130 to provide signals A and B (FIG. 5) which are 90 electrical degrees out of phase. Accordingly, if signal A lags signal B by 90° (FIG. 5) the D.C. motor shaft 122 (FIG. 1), and thus the drum 38, is rotating clockwise, whereas if signal A leads signal B by 90° (FIG. 5) the shaft 122 and drum 38 are both rotating counter-clockwise. Accordingly, the angular displacement in either direction of rotation of the drum 38 (FIG. 1) from its home position may be incrementally counted by counting the number of pulses A or B, (FIG. 5) as the case may be, and accounting for the lagging or leading relationship of pulse A (FIG. 5) with respect to pulse B.

Figure 6:
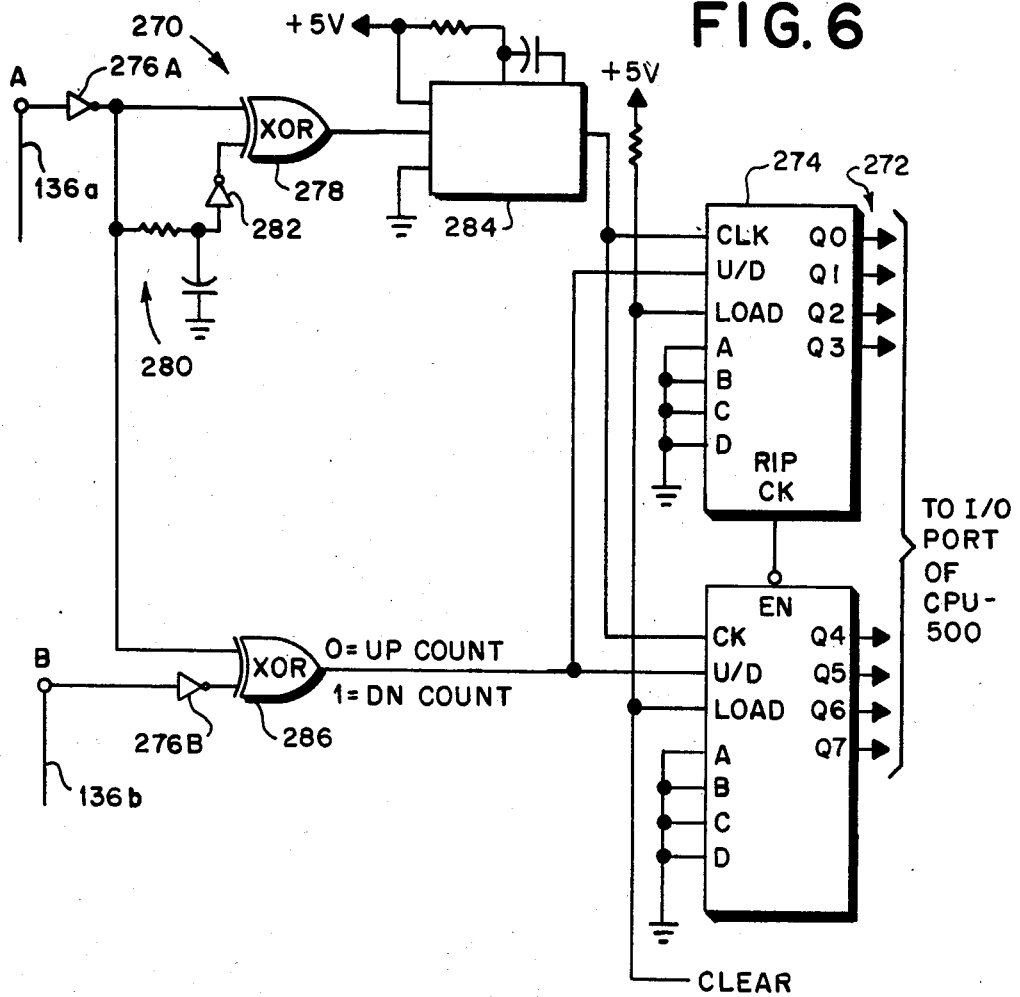
FIG. 6 a schematic diagram of a preferred counting circuit for providing an eight bit wide digital signal for the computer which numerically represents the direction of rotation, and angular displacement, of the motor drive shaft, and thus the drum, from its home position.

The quadrature encoder communication lines, 136a and 136b (FIG. 1), may be connected either directly to the computer 500 for pulse counting thereby or to the computer 500 via a conventional counting circuit 270 (FIG. 6), depending on whether or not the internal counting circuitry of the computer 500 is or is not available for such counting purposes in consideration of other design demands of the system in which the computer 500 is being used. Assuming connection to the computer 500 via a counting circuit 270, the aforesaid communications lines, 136a and 136b are preferably connected via terminals A and B, to the counting circuit 270.

In general, the counting circuit 270 (FIG. 6) utilizes the pulses A (FIG. 5) to generate a clock signal and apply the same to a conventional binary counter 274 (FIG. 6), and to generate an up or down count depending on the lagging or leading relationship of pulse A (FIG. 5) relative to pulse B and apply the up or down count to the binary counter 274 (FIG. 6) for counting thereby. More particularly, the pulses A and B (FIG. 5) which are applied to the counting circuit terminals A and B (FIG. 6) are respectively fed to Schmidt trigger inverters 276A and 276B. The output from the inverter 276A is fed directly to one input of an XOR gate 278 and additionally via an R-C delay circuit 280 and an inverter 282 to the other input of the XOR gate 278. The output pulses from the XOR gate 278, which acts as a pulse frequency doubler, is fed to a conventional one-shot multivibrator 284 which detects the trailing edge of each pulse from the XOR gate 278 and outputs a clock pulse to the clock input CK of the binary counter 274 for each detected trailing edge. The output from the Schmidt trigger inverters 276A and 276B are respectively fed to a second XOR gate 286 which outputs a low logic level signal (zero), or up-count, to the up-down pins U/D of the binary counter 274 for each output pulse A (FIG. 5) which lags an output pulses B by 90 electrical degrees. On the other hand the XOR gate 286 (FIG. 6) outputs a high logic level (one) or down-count, to the up-down input pins of the binary counter 274 for each encoder output pulse A (FIG. 5) which leads an output pulse B by 90° electrical degrees. Accordingly, the XOR gate 286 (FIG. 6) provides an output signal for each increment of angular displacement of the encoded shaft 122 (FIG. 1) and identifies the direction, i.e., clockwise or counter-clockwise, of rotation of the encoded shaft 122. The binary counter 274 (FIG. 6) counts the up and down count signals from the XOR gate 286 whenever any clock signal is received from the multivibrator 284, and updates the binary output signal 272 to reflect the count.

Accordingly, the counting circuit 270 converts the digital signals A and B, which are representative of incremental angular displacements of the drive shaft 122 in either direction of rotation thereof, to an eight bit wide digital logic output signal 272 which corresponds to a summation count at any given time, of such displacements, multiplied by a factor of two, for use by the computer 500. Since the angular displacement of the shaft 122 from its home position is proportional to the angular displacement of the drum 38 from its home position, the output signal 272 is a count which is proportional to the actual linear displacement of the outermost periphery of the drum 38 at the end of a given time period of rotation of the drum 38 from its home position. For a typical postage meter drum 38, having a circumference, i.e., the arc described by the outermost periphery of the drum 38 in the course of revolution thereof, of 9.42 inches, which is connected to the motor drive shaft 122 via a mechanical transmission system having a 5:1 gear ratio between the motor 120 and drum 38, wherein the encoder disc 128 has 192 lines; the counting circuit 270 will provide an output of 2×192=384 counts per revolution of the shaft 122, and 5×384=1920 counts per revolution of the drum 38 which corresponds to 203.82 counts per inch of linear displacement of the periphery of the drum. Accordingly, the maximum mailpiece transport velocity of V1=61(10$^{-3}$) inches per millisecond may be multiplied by a scale factor of 203.82 counts per inch to express the maximum transport velocity in terms of counts per millisecond, or, counts per sampling time period T where T=1 millisecond; i.e., 61(10$^{-3}$) inches per millisecond times 203.82 counts per inch=12.43 counts per sampling time period T. Similarly, any other target velocity V1, or any acceleration or deceleration value, may be expressed in terms of counts per sampling time interval T, or counts per square millisecond, as the case may be, by utilization of the aforesaid scale factor.

For energizing the D.C. motor 120 (FIG. 1) there is provided a power amplifying circuit 300. The power amplifying circuit 300 (FIG. 7) is conventionally operably connected to the motor terminals 302 and 304 via power lines 306 and 308 respectively. The power amplifying circuit 300 preferably comprises a conventional, H-type, push-pull, control signal amplifier 301 having input leads A, B, C and D, a plurality of optical-electrical isolator circuits 303 which are connected on a one-for-one basis between the leads A-D and four output terminals of the computer 500 for coupling the control signals from the computer 500 to the input leads A, B, C, and D of the amplifier 301, and a plurality of conventional pull-up resistors 305 for coupling the respective leads A-D to the 5 volt source. The amplifier 301 includes four conventional darlington-type, pre-amplifier drive circuits including NPN transistors T1, T2, T3 and T4, and four, conventional, darlington-type power amplifier circuits including PNP transistors Q1, Q2, Q3 and Q4 which are respectively coupled on a one-for-one basis to the collectors of transistors T1, T2, T3 and T4 for driving thereby. The optical-electrical isolator circuits 303 each include a light emitting diode D1 and a photo-responsive transistor T5. The cathodes of D1 are each connected to the 5 volt source, the emitters of T5 are each connected to ground and the collectors of T5 are each coupled, on a one-for-one basis, to the base of one of the transistors T1, T2, T3 and T4. With respect to each of the opto-isolator circuits 303, when a low logic level signal is applied to the anode of D1, D1 conducts and illuminates the base of T5 thereby driving T5 into its conductive state; whereas when a high logic level signal is applied to the anode of D1, D1 is non-conductive, as a result of which T5 is in its nonconductive state. With respect to each of the combined amplifier circuits, T1 and Q1, T2 and Q2, T3 and Q3, and T4 and Q4, when the lead A, B, C or D, as the case may be, is not connected to ground via the collector-emitter circuit of the associated opto-isolator circuit's transistor T5, the base of T1, T2, T3 or T4, as the case may be, draws current from the 5 volt source via the associated pull-up resistor 305 to drive the transistor T1, T2, T3 or T4, as the case may be, into its conductive state. As a result, the base of transistor Q1, Q2, Q3 or Q4, as the case may be, is clamped to ground via the emitter-collector circuit of its associated driver transistor T1, T2, T3 or T4, thereby driving the transistor Q1, Q2, Q3 or Q4, as the case may be, into its conductive state. Contrariwise, the transistor pairs T1 and Q1, T2 and Q2, T3 and Q3, and T4 and Q4 are respectively biased to cut-off when lead A, B, C or D, as the case may be, is connected to ground via the collector-emitter circuit of the associated opto-isolator circuit's transistor T5. As shown in the truth table (FIG. 8) for clockwise motor rotation, Q1 and Q4 are turned on and Q2 and Q3 are turned off; whereas for counter-clockwise motor rotation, Q2 and Q3 are turned on and Q1 and Q4 are turned off. Accordingly, for clockwise motor rotation: terminal 302 (FIG. 7) of the motor 120 is connected to the 30 volt source via the emitter-collector circuit of Q1, which occurs when Q2 is turned off and the base of Q1 is grounded through the emitter-collector circuit of T1 due to the base of T1 drawing current from the 5 volt source in the presence of a high logic level control signal at input terminal A; and terminal 304 of the motor 120 is connected to ground via the emitter-collector circuit of Q4, which occurs when Q3 is turned off and the base of Q4 is grounded through the emitter-collector circuit of T4 due to the base of T4 drawing current from the 5 volt source in the presence of a high logic level signal at the input terminal D. On the other hand, for counter clockwise rotation of the motor 120: terminal 302 of the motor 120 is connected to ground via the emitter-collector circuit of Q2, which occurs when Q1 is turned off and the base of Q2 is grounded through the emitter-collector circuit of T2 due to the base of T2 drawing current from the 5 volt source in the presence of a high logic level control signal at the input terminal B; and terminal 304 of the motor 120 is connected to the 30 volt source via the emitter-collector circuit of Q3, which occurs when Q4 is turned off and the base of Q3 is grounded through the emitter-collector of T3 due to the base of T3 drawing current from the 5 volt source in the presence of a high logic level control signal at the input terminal C. For turning off the respective powers transistors Q1-Q4, on a two at a time basis, low level control signals are applied on a selective basis to the two terminals B and C, or A and D, as the case may be, to which high logic control level signals are not being applied; which occurs when the opto-isolator circuit's transistors T5 associated with the respective leads B and C or A and D are driven to their conductive states. When this occurs the bases of the transistors T2 and T3, or T1 and T4, as the case may be, are biased to open the emitter-collectors circuits of the transistors T2 and T3, or T1 and T4, as the case may be, as a result of which the bases of the transistors Q2 and Q3, or Q1 and Q4, as the case may be, are biased to open the emitter-collector circuits of transistors Q2 and Q3, or Q1 and Q4, as the case may be.

The velocity of the motor 120 (FIG. 7) is controlled by modulating the pulse width and thus the duty cycle of the high logic level, constant frequency, control signals, i.e., pulse width modulated (PWM) signals, which are timely applied on a selective basis to two of the leads A-D, while applying the low level logic signals to those of leads A-D which are not selected. For example, assuming PWM signals (FIG. 9) having a 50% duty cycle are applied to leads A and D (FIG. 7), and low level logic signals are applied to leads B and C, for clockwise rotation of the motor 120, the velocity of the motor 120 will be greater than it would be if high logic level PWM signals (FIG. 9) having a 25% duty cycle were similarly applied and will be less than it would be if high logic level PWM signals having a 75% duty cycle were similarly applied. Accordingly, assuming rotation of the motor 120 (FIG. 7) is commenced by utilizing high logic level PWM signals having a given duty cycle percentage, the velocity of the motor 120 may be decreased or increased, as the case may be, by respectively decreasing or increasing the duty cycle percentage of the applied high logic level PWM signals. Further, assuming the motor 120 is rotating clockwise due to PWM signals having a selected positive average value being applied to leads A and D, in combination with low level logic signals being applied to leads B and C, the motor 120 may be dynamically braked by temporarily applying high level PWM signals having a selected duty cycle corresponding to a given positive average value to leads B and C, in combination with low logic signals being applied to leads A and D. To avoid damage to the power transistors Q1, Q2, Q3 and Q4 which might otherwise result, for example, due to current spikes accompanying back emf surges which occur in the course of switching the circuit 301 from one mode of operation to the other, the emitter-collector circuits of the power transistors Q1, Q2, Q3 and Q4 are respectively shunted to the 30 volt source by appropriately poled diodes, D1, D2, D3 and D4 connected across the emitter-collector circuits of Q1, Q2, Q3 and Q4.

As shown in FIG. 1, according to the invention, the D.C. motor 120 is utilized for driving a plurality of different loads. To that end, the motor 120 includes a splined, preferably triangularly-shaped, output shaft 122 on which the encoder disc 128 is fixedly mounted and to which the drive gear 124 is slidably attached. In addition, the mailing machine 12 includes mode selection apparatus 400 for slidably moving the drive gear 124 lengthwise of the shaft and selectively into engagement with one of a plurality of mechanical loads. The mode selection apparatus 400 includes a stepper motor 402 which is conventionally coupled to the computer 500 for operation thereby. The stepper motor 402 has an output shaft 404 on which a pinion gear 406 is fixedly mounted for rotation by the shaft 404. In addition, the apparatus 400 includes a carriage 420, which is conventionally slidably mounted on the motor output shaft 122. The drive gear 124 is conventionally rotatably attached to the carriage 420 and slidably moveable therewith along the shaft 122. Thus, the drive gear 124 may be located at various positions lengthwise of the shaft 122 by moving the carriage 420. To that end, the mode selection apparatus 400 includes a rack 422 which is fixedly attached to the carriage 420, extends parallel to the motor output shaft 122 and is disposed in meshing engagement with the stepper motor's pinion gear 404. In response to signals received by the stepper motor 402 from the computer 500, the stepper motor pinion gear 406 indexes the rack 422, and thus the carriage 420 to carry the pinion gear 124 into meshing engagement with the drum drive gear 90, both of the postage value selection gears 430 and 432, either of the postage value selection gears 430 or 432, or any other power transfer gear 434. For example, the power transfer gear 434 may be mounted on a shaft 435 and utilized for driving a conventional tape feeding mechanism and tape cutting knife 436, operable under the control of the computer 500 in response to actuation of the key 53c (FIG. 2) for feeding tape to the drum and, after the tape is fed by the drum 38 and the computer 500 operates the solenoid 436a of the knife to cut off a pre-determined length of tape, feeding back the remaining tape from the path of travel 18. For the purposes of this disclosure, the tape feeding mechanism 436 (FIG. 1) is intended to be representative of that particular load or any other operator selectable, conventional load, for example, in a mailing machine 12 or postage meter 10.

. To lock the non-selected power transfer gears of the group of gears 90, 430, 432 and 434 against rotation when the selected one or more of gears 90, 430, 432 and 434 are being driven by the motor drive gear 124, the carriage 420 additionally includes a first projecting tooth 448, extending parallel to the motor drive shat 122, which is dimensioned for meshing engagement with each of the gears 90,430 and 432 and a second projecting tooth 449, extending parallel to the motor drive shaft 122, which is dimensioned for meshing engagement with the gear 434. Of course, if gear 434 were located for engagement by tooth 448 rather than tooth 449 the projecting tooth 449 would be superfluous. Accordingly, in the context of this disclosure the carriage 420 includes at least one, and may include more than one, projecting tooth 448 or 449, or both. Assuming the stepper motor 402 is energized to cause the carriage 420 to index the motor drive gear 124 into engagement with the transfer gear 90 for driving the drum 38, the projecting tooth 448 is concurrently indexed into engagement with gears 430 and 432, and the projecting tooth 449 is concurrently indexed into engagement with the gear 434, thereby locking gears 430, 432 and 434 against rotation. Further, assuming the stepper motor 402 is energized to cause the carriage 420 to index the motor drive gear 124 into engagement with both of the gears 430 and 432 for concurrently driving the gears 430 and 432, the projecting tooth 448 is concurrently indexed into engagement with the drum drive transfer gear 90, whereas the projecting tooth 449 is concurrently driven into engagement with the gear 434, for locking the gears 90 and 434 against rotation. Thus, in general, when at least one (or more) of the gears of the group 90, 430, 432, 434, is (or are) engaged for rotation by the motor output gear 124 the remaining one (or more) gears of the group of 90, 430, 432, 434 is (or are) locked against rotation by the carriage 420. In this connection it is noted that any of the gears 90, 430, 432 and 434 and other power transfer gears may be located for engagement by either of the projecting teeth 448 and 449, and that the axial length of the gear 124 may be either expanded or contracted to facilitate engaging one or more of such gears without departing from the spirit and scope of this disclosure.

The mode selection apparatus 400 also preferably includes a quadrature encoder sensing device 452 for coupling the computer 500 to the stepper motor output shaft 404. The encoder 452, which is preferably substantially the same as the encoder 126, includes a disc 454 which is fixedly attached to the shaft 404 and a sensor 456 which is electro-optically coupled to the disc 454 to provide the computer 500 with input signals A and B (FIG. 5) which are representative of the magnitude and direction of angular displacement of the motor output shaft 404 (FIG. 1) from a home position. The signals A and B (FIG. 5) from the sensor 456 may be coupled either directly to the computer 500 (FIG. 1) or indirectly thereto via a counting circuit 270. In any event the signals A and B from the sensor 456 are respectively coupled via communications lines 457a and 457b. The home position may be identified by means of an opening 458, formed in the encoder disc 454, which is sensed by the sensor 456 when the motor drive gear 128 is located in its home position, which, by definition, is preferably when the gear 124 is located in a neutral position, i.e., a predetermined position out of engagement with any of the transfer gears 90, 430, 432, or 434.

As shown in FIG. 1, the postage meter 10 conventionally includes a plurality of racks 460 which are suitably slidably mounted in a channel 462, formed in the drum drive shaft 74, and a plurality of print wheels 464 which are conventionally rotatably mounted within the postage meter's drum 38. In addition, the meter 10 includes a plurality of pinion gears 466 (one of which is shown), which are conventionally connected, on a one-for-one basis, with each of the print wheels 464 and disposed in meshing engagement, on a one-for-one basis, with each of the racks 460. Accordingly, lengthwise movement of a given rack 460 results in rotation of the associated print wheel 464 for selectively locating a given one of the print wheel's print elements 465, one of which is shown and each of which corresponds to a different one of the numerals of the numeric keys (0–9 inclusive) or the decimal point "." of the decimal point key of the keyboard 30, at the outer periphery of the drum 38 to effectuate printing a selected postage value on a mailpiece 16 when the drum 38 is rotated into engagement with the mailpiece 16.

In the preferred embodiment the D.C. motor 120 is utilized for driving a conventional rotary postage value selection mechanism 470 (FIG. 1) of the type shown in U.S. patent application Ser. No. 657,701 filed concurrently herewith in the name of P. Sette and assigned to the assignee of the present invention. The rotary value selection mechanism 470 generally comprises an annularly-shaped rack selection member 472, having external gear teeth 474, which is conventionally rotatably mounted on the drum drive shaft 74. In addition the mechanism 470 includes a pinion gear 476, which is conventionally rotatably connected internally to the member 472. Rotation of the annular member 472 thus carries the pinion gear 476 into meshing engagement with any one of the respective racks 460 for selection thereof. Further, the mechanism 470 includes an annularly-shaped digit, or print element, selection member 478 having external gear teeth 480, which is conventionally rotatably mounted on the member 472. The selection member 478 includes internal, helically threaded, gear teeth 482, which are disposed in meshing engagement with the pinion gear 476. Rotation of the selection member 478 thus rotates the pinion gear 476 for lengthwise moving the selected rack 460 to rotate its associated print wheel 464 for selecting the print element 465 thereof which is to be utilized for printing purposes. The drive train of the rotary value selection mechanism may include transfer gears 484 and 486 which are respectively disposed in meshing engagement with gear teeth 474 and 478 and are respectively mounted on shafts 484a and 486a. The shafts 484a and 486a are each suitably rotatably attached to the casing 36 of the postage meter 10. For counting increments of angular displacement of the respective shafts, 484a and 486a, and thus the angular displacement of the respective selection members 472 and 478, the shafts 484a and 486a respectively have connected thereto quadrature encoder sensing devices 488 and 490 for coupling the postage meter's computer 41 to the postage value selection mechanism 470 to permit the computer 41 to verify postage value selections. The respective encoders 488 and 490 are preferably substantially the same as the encoder 126. The encoder 488 includes a disc 488a, which is fixedly attached to the shaft 484a, and a sensor 488b which is electro-optically coupled to the disc 488a to provide the computer 41 with input signals A and B which are representative of the magnitude and direction of angular displacement of the rack selection member 472 from a home position. Correspondingly, the encoder 490 includes a disc 490a, which is fixedly attached to the shaft 486a, and a sensor 490b which is electro-optically coupled to the disc 490a to provide the computer 41 with input signals A and B (FIG. 5) which are representative of the magnitude and direction of rotation of the print element selection member 478 from a home position. The home position of the encoder discs 488a and 490a may be identified, in the case of the disc 488a by means of an opening 488c formed in the disc 488a, and in the case of the disc 490a by means of the encoder line of the disc 490a which is being sensed by the sensor 490b at the time of commencement of rotation of the shaft 486a. The signals A and B (FIG. 5) from the sensor 488b are respectively coupled to the computer 41 (FIG. 1) via the communications lines 488d and 488e; whereas the signals A and B from the sensor 490b are respectively coupled to the computer 41 via the communications lines 490d and 490e. However, it is within the scope of this disclosure to couple the sensors 488b and 490b to the computer 41 via a counting circuit 270, for the reasons hereinbefore discussed in connection with coupling the sensor 134 to the computer 500. For the selection member 472 the home position may, by definition, be any position in which the pinion gear 476 is located out of engagement with any of the racks 460; whereas for the selection member 478 the home position is by definition, a floating position corresponding to its location at the time of commencement of actuation of a given rack 460.

For driving the selection members 474 and 478, the gears 484 and 486 may respectively be located in meshing engagement with the transfer gears 432 and 430, or, alternatively, conventional transmission systems 492 and 494 may be respectively be provided between gear 432 and gear 484, and between gear 430 and gear 486. For example, the transmission system 492 may include an idler gear 496 which is located in the postage meter 10 and disposed in meshing engagement with gears 484 and 432, and the transmission system 494 may include an idler gear 498 which is located in the postage meter 10 and disposed in meshing engagement with gears 486 and 430. Assuming the latter arrangement, the idler gear 496 may be suitably mounted on a shaft 496a which is conventionally attached to the postage meter's frame 36 and the idler gear 498 may be suitably mounted on a shaft 498a which is conventionally attached to the frame 36. In operation the selection members 472 and 478 are preferably concurrently driven when indexing the pinion gear 476 from rack 460 to rack 460 and out of engagement with any of the racks 460, to avoid binding between the pinion gear 476, racks 460 and selection member 478. And, to locate the pinion gear 476 out of engagement with any of the racks 460 the drum drive shaft 74 is preferably relieved, for example, by means of teeth 499 having the same spacing as the teeth of the racks 460. Accordingly, the D.C. motor drive gear 124 is preferably indexed into engagement with the transfer gear 430 alone and in combination with the transfer gear 432 for postage value selection purposes.

A more detailed description of the mechanical structure of the rotary value selection mechanism 470 (FIG. 1) and alternate embodiments and improvements of the same may be found in the aforesaid concurrently filed U.S. patent application of P. Sette.

To control the motion of the drum 38 (FIG. 1) during each cycle of drum rotation, the D.C. motor 120 and its shaft encoder 126 are respectively connected to the computer 500 via the power amplifier circuit 300 and the counting circuit 270. And the computer 500 is preferably programmed to calculate the duration of and timely apply PWM control signals to the power amplifier circuit 300 after each sampling time instant Tn, utilizing an algorithm based upon a digital compensator D(s) derived from analysis of the motor 120, motor load 38, 74, 76, 90 and 124 amplifying circuit 300, encoder 126, counting circuit 270, and the digital compensator D(s) in the closed-loop, sampled-data, servo-control system shown in FIG. 10.

Figure 10:
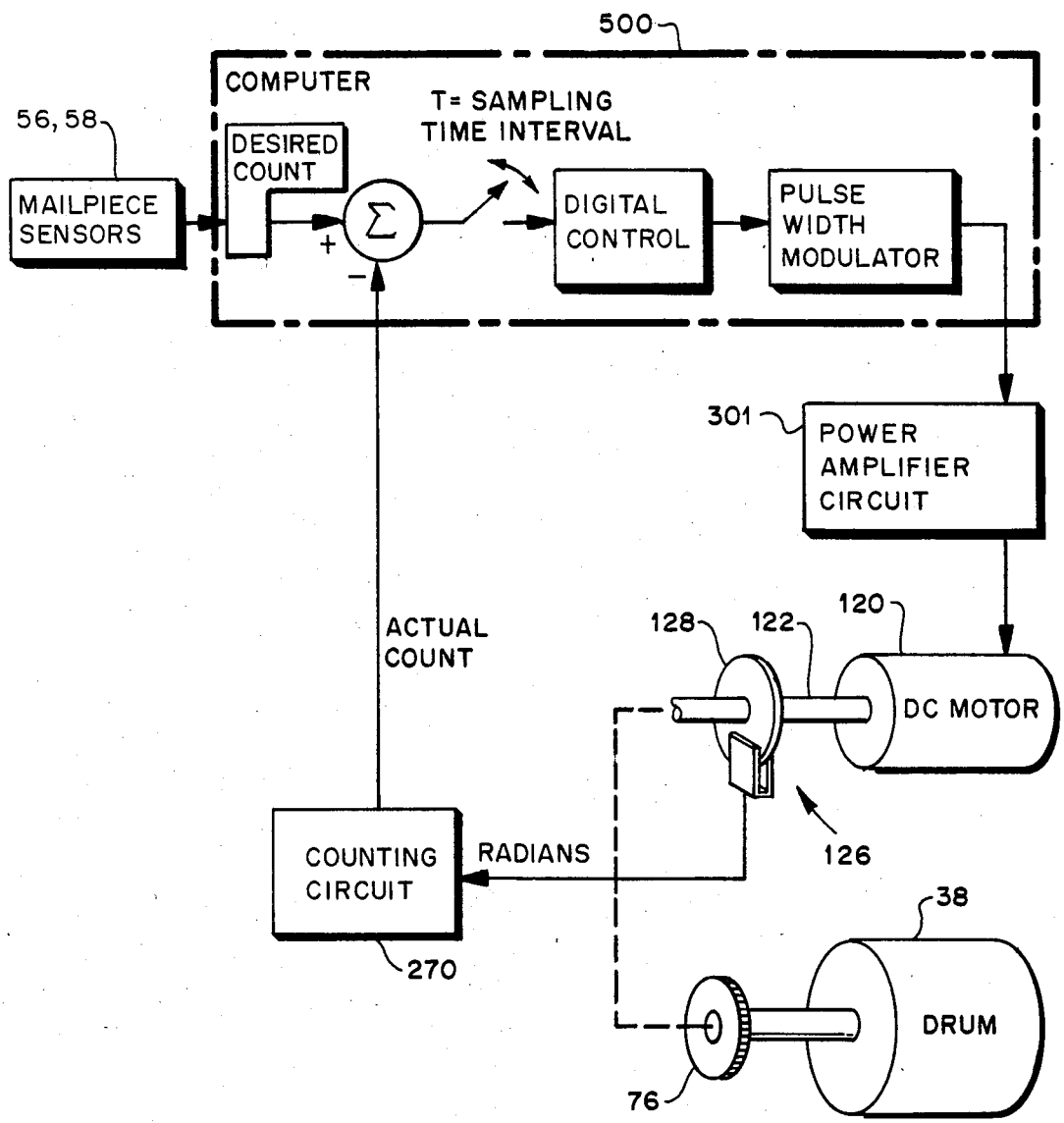
FIG. 10 shows a closed-loop servo system including the D.C. motor and computer.

With reference to FIG. 10, in general, at the end of each predetermined sampling time period of T=1 millisecond, the eight bit wide count representing the angular displacement of the motor drive shaft 122, and thus the drum 38, from its home position is sampled by the computer 500 at the time instant Tn. Under the control of the program of the computer 500 (FIG. 10), a summation is taken of the aforesaid actual count and the previously calculated count representing the desired position of the motor drive shaft 122, and thus the drum 38, at the end of the time period T, and, under control of the computer program implementation of the algorithm, a PWM control signal which is a function of the summation of the respective counts, or error, is applied to the power amplifier circuit 301 for rotating the motor drive shaft 122 such that the error tends to become zero at the end of the next sampling time period T.

Figure 11:
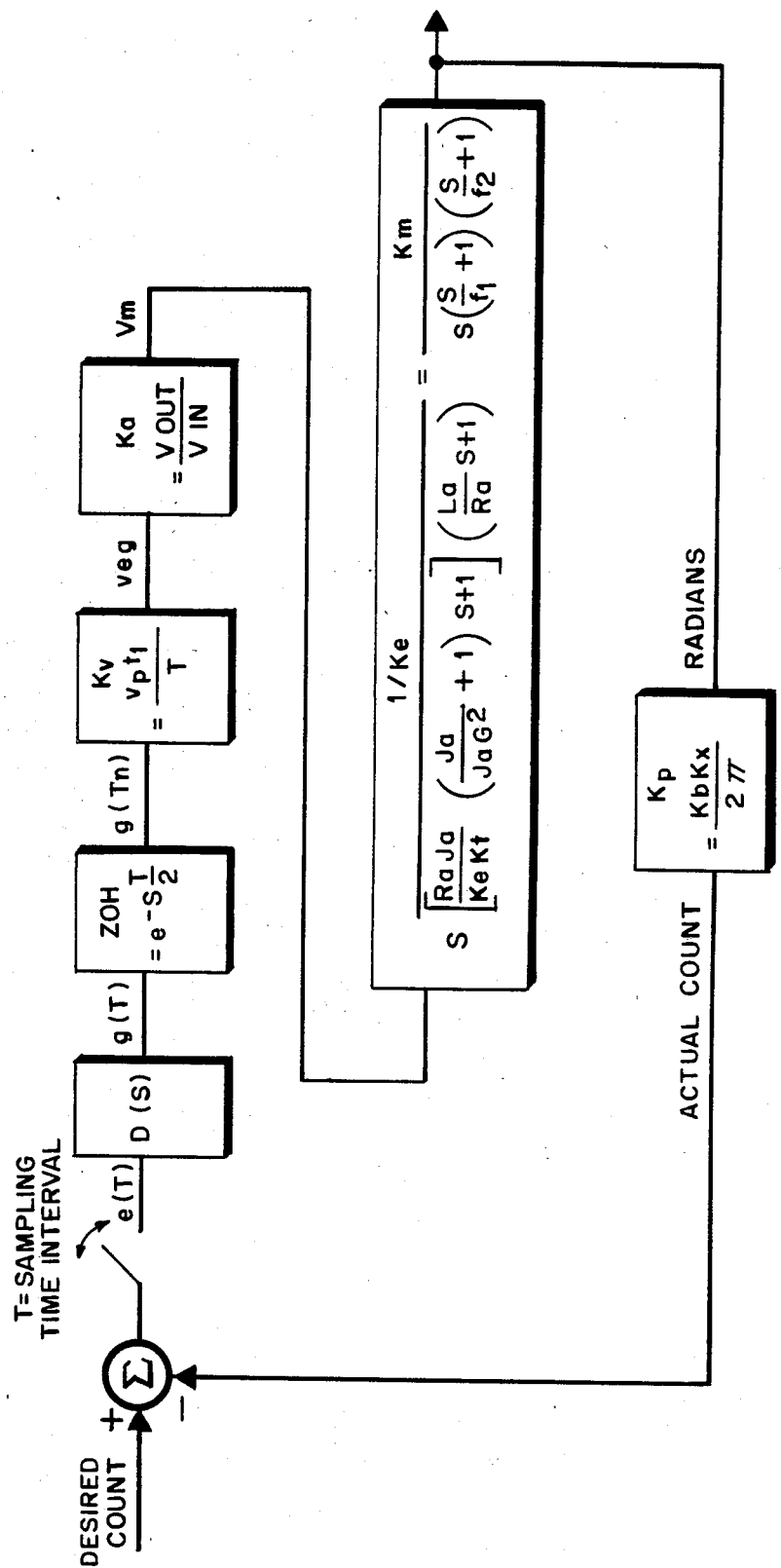
FIG. 11 is a block diagram portraying the laplace transform equations of the closed-loop servo system shown in FIG. 10.

To derive the algorithm, the servo-controlled system of FIG. 10 is preferably analyzed in consideration of its equivalent Laplace transformation equations shown in FIG. 11, which are expressed in terms of the following Table of Parameters and Table of Assumptions.

TABLE I

| Parameter | Symbol | Value and/or Dimension |
|---|---|---|
| Zero-Order-Hold | ZOH | None |
| Laplace Operator | S | jw |
| Sampling Interval | T | Milliseconds |
| PWM D.C. Gain | $K_v$ | Volts |
| PWM Pulse Amplitude | $V_p$ | 5 Volts |
| PWM Pulse Width | $t_l$ | $10^{-6}$ Microseconds |
| Power Switching Circuit Gain | $K_a$ | None |
| Motor back e.m.f. Constant | $K_e$ | 0.63 Volts/radian/second |
| Motor Armature Resistance | $R_a$ | 1.65 Ohms |
| Motor Armature Moment of Inertia | Ja | $2.12 (10^{-5})$ kilograms |
| Motor Torque Constant | $K_t$ | 0.063 Newton-Meters/amp |
| Drum Moment of Inertia | $J_l$ | $70.63 (10^{-5})$ kilograms (meters$^2$) |
| Gear Ratio, Motor to Load | G | 5:1, None |
| Motor Armature Inductance | $L_a$ | 2.76 Millihenrys |
| Motor Shaft Encoder Gain | $K_p$ | Counts/radian |
| Motor Shaft Encoder Constant | $K_b$ | 192 Lines/revolution |
| Counting Circuit Multiplier | $K_x$ | 2, None |
| Motor Gain | $K_m$ | 16, None |
| Poles in frequency domain | $f_1;f_2$ | 48;733 Radians/second |
| Starting Torque Gain | $K_c$ | None |
| System Overall Gain | $K_o$ | None |

TABLE II

| | Assumptions |
|---|---|
| ZOH: | Since the output and input are held constant during each sampling period a zero-order-hold is assumed to approximate the analog time function being sampled. |
| Veq.: | Since the integral of the voltage in time is assumed equal to the area under the PWM pulse, the output from the PWM is linear. |

With reference to FIG. 10, D(S) is the unknown transfer function of an open loop compensator in the frequency domain. Due to a key factor for providing acceptably fast motor response being the system's resonance between the motor and load, the derivation of the transfer function D(S) for stabilization of the system is preferably considered with a view to maximizing the range of frequencies within which the system will be responsive, i.e., maximizing the system's bandwidth, BW. For calculation purposes a sampling period of T=1 millisecond was chosen, due to having chosen a Model 8051 microprocessor, available from Intel Corporation, Palo Alto, Calif., for control purposes, and inasmuch as the Model 8051 microprocessor equipped with a 12 MHz crystal for providing a clock rate of 12 MHz, is able to conveniently implement a 1 KHz sampling rate and also implement application software routines, after control algorithm iterations, during the sampling period of T=1 millisecond. However, other sampling periods and other conventional microprocessors may be utilized without departing from the spirit and scope of the invention.

The open loop system gain $H_1(S)$ without compensation, of the servo-loop system of FIG. 10 is shown in FIG. 12(a). To tolerate inaccuracies in the transmission system between the motor and drum load, such as backlash, it was considered acceptable to maintain a steady-state count accuracy of plus or minus one count. To reflect this standard, the gain equation of FIG. 12(a) was adjusted to provide a corrective torque $C_t$ with a motor shaft movement, in radians per count, equivalent to the inverse expressed in radians per count, of the gain $K_p$ of the encoder counting circuit transform. Since the corrective torque $C_t$ is primarily the friction of the transmission system which has to be overcome by the motor at start-up, the value of $C_t$ may be assumed to be substantially equal to a maximum estimated numerical value based on actual measurements of the starting friction of the system, i.e., 35 ounce-inches, as a result of which a numerical value of the starting voltage $V_s$ may be calculated from the expression $V_s=(C_t)R_a/K_t$, i.e., $V_s=6.5$ volts, which, in turn, permits calculation of a numerical value for the minimum overall system gain $K_o$, at start-up, from the equation $K_o=V_s/K_p$, i.e., $K_o=397$ volts per radian, or for simplication purposes, 400 volts/radian. Accordingly, the open-loop uncompensated gain $H_1(S)$ may be rewritten as $H_2(S)$ as shown in FIG. 12(b), in which a gain factor of $K_c$ has been included, to account for the torque $C_t$ and the value of $K_o$ is substituted for the overall D.C. gain, i.e., $(K_v)(K_m)(K_p)(K_a)(K_c)=K_o$. Although the numerical value of $K_c$ may also be calculated, it is premature to do so, since it has not as yet been established that $K_o$, which has been adjusted by the value of $K_c$ to provide a minimum value of $K_o$, is acceptable for system stability and performance purposes. Otherwise stated, $K_o$ may not be the overall system gain which is needed for system compensation for maximizing the system bandwidth BW, as a result of which it is premature to conclude that $K_c$ will be equivalent to the D.C. gain of the system compensator D(S).

At this juncture, the Bode diagram shown in FIG. 13, may be constructed due to having calculated a minimum value for $K_o$. As shown in FIG. 13, the absolute value of $H_2(S)$, in decibels, has been plotted against the frequency W in radians per second, based on the calculated minimum value of $K_o$, the selected value of T and calculated values of the poles $f_1$ and $f_2$. From the Bode diagram, a numerical value of the crossover frequency $W_{c1}$ of the Bode plot of $H_2(S)$ may be determined, i.e., $W_{c1}$ was found to be substantially 135 radians per second. And, since the value of $W_{c1}$ is substantially equal to the bandwidth $BW_u$ of the uncompensated open-loop system $H_2(S)$, a calculation may be made of the phase margin $\theta_m$ of the uncompensated system from the expression $\phi_m = 180° - \theta\ [H(S)]$ at $W_{c1}$, or, otherwise stated: $\phi_m = 180° - \tan^{-1}(W_{c1}) - \tan^{-1}(W_{c1}/f_1) - \tan^{-1}(W_{c1}/f_2) - \tan^{-1}(W_{c1}T/2)$. From this calculation, there was obtained a phase margin value which was much, much, less (i.e., 5°) than 45°, which, for the purposes of the calculations was taken to be a minimum desirable value for the phase margin $\phi_m$ in a position-type servo system. Accordingly, it was found that the uncompensated system $H_2(S)$ was unstable if not compensated. Since an increase in phase lead results in an increase in bandwidth BW, and the design criteria calls for maximizing the bandwidth BW and increasing the phase margin to at least 45°; phase lead compensation was utilized.

By definition, a phase lead compensator D(S) has the Laplace transform shown in FIG. 14, wherein $K_c$ is the phase lead D.C. gain, and $f_z$ and $f_p$ are respectively a zero frequency and a pole frequency. Adding the transfer function of the phase lead compensator D(S) to the Bode plot of the uncompensated system's transfer function $H_2(S)$, results in the Bode plot of the compensated system transfer function $H_3(S)$, if the zero frequency $f_z$ of the phase lead compensator D(S) is chosen to be equivalent to $f_1$ in order to cancel the lag due to the mechanical time constant of the uncompensated transfer function $H_2S$. As shown in FIG. 13, the cross-over frequency $W_{c2}$ for the compensated system $H_3(S)$ may be read from the Bode diagram, i.e., $W_{c2}$ was found to be substantially equal to 400 radians per second. And, since by definition the crossover frequency $W_{c2}$ lies at the geometric mean of $f_p$ and $f_z$, the value of the $f_p$ may be established by doubling, from $f_z$, the linear distance between $W_{c2}$ and $F_z$, as measured along the logarithmic frequency axis, W, and reading the value of $f_p$ from the Bode diagram, i.e., $f_p$ was found to be substantially equal to 3,400 radians per second. Since numerical values may thus be assigned to both $W_{c2}$ and $f_p$ from the Bode diagram, the compensated phase margin $\phi_{mc}$, i.e., the phase margin for the phase lead compensated system $H_3(S)$ in which $f_z$ has been equated to $f_1$, may be found from the expression $\phi_{mc} = 180° - 90° - \tan^{-1}(W_{c2}/f_2) - \tan^{-1}(W_{c2}T/2)$. Upon o calculating the compensated phase margin $\phi_{mc}$ it was found to be 50° and, therefore, greater than the minimum phase margin criteria of 45°. In addition, the value of $W_{c2}$ for the compensated system $H_3(S)$ was found to be substantially three times that of the uncompensated system $H_2(S)$, as a result of which the bandwidth BW of the system H(S) was increased by a factor of substantially three to $BW_c$.

At this juncture, the compensated system $H_3(S)$ is preferably analyzed with reference to the system's overshoot $O_s$ and settling time $t_s$ based on a calculation of the system damping factor $d_f$ and the assumption that the system will settle in five times constants, i.e., $t_s = 5t_x$. The relevant values may be calculated or estimated, as the case may be, from the expressions, for $d_f$, $o_s$, $t_x$ and $t_s$ shown in FIG. 15. In connection with this analysis, reference is also made to the typical mailing machines hereinbefore described, wherein a maximum drum cycle time period $T_{ct}$ (FIG. 3) of 234 milliseconds and a maximum mailpiece transport speed (FIG. 2) of 61 inches per second are typical values. Assuming the velocity profile of FIG. 3, and, as previously discussed an acceleration time period of $T_a = 37$ milliseconds, a constant velocity time period of $T_c = 124$ milliseconds and decceleration time period of $T_d = 24$ milliseconds, the longest permissible settling time for the system was calculated, i.e., $T_{ct} - (T_a + T_c + T_d) = 234 - 185 = 49$ milliseconds. For analysis purposes a series of calculations of the aforesaid system characteristics and phase margin were performed, assuming incremental increases in the overall system gain $K_o$, while holding $f_z = f_1$. The results of such calculations are shown in the following Table III.

TABLE III

| | | $H_3(S)$ with $f_z = f_l$ | | |
|---|---|---|---|---|
| $K_o$=system gain | $W_c$=BW (rad./sec.) | $\theta_m$=phase Margin (deg.) | $O_s$=overshoot (percent) | $t_s$=settling time (MS.) |
| 400 | 400 | 50 | 28 | 28.67 |
| 447 | 450 | 46 | 31 | 27.78 |
| 501 | 500 | 42 | 34 | 27.50 |
| 562 | 550 | 38 | 38 | 27.41 |

As shown in Table III, the system bandwidth BW may be maximized at 450 radians per second while maintaining a phase margin $\phi_m$ of at least 45° the two design criteria discussed above. Although this results in an increase in system overshoot $O_s$ accompanied by a negligible decrease in the settling time $t_s$, the settling time $t_s$ is well within the maximum allowable settling time, $T_s = 49$ milliseconds. On the other hand, if a bandwidth of 400 radians per second is acceptable, it is desirable to reduce the percentage of overshoot $O_s$, and increase the phase margin to $\theta_{mc} = 50$ to provide for greater system stability than would be available with a phase margin value (i.e., 46°) which is substantially equal to the design criteria minimum of 45°; in which instance it is preferable to choose the bandwidth of BW=400 radians per second, overshoot of $O_s = 28\%$ and compensated phase margin of $\theta_{mc} = 50°$. For the example given, a compensated Bandwidth of $BW_c = 400$ radians per second is acceptable inasmuch as worst case load conditions were assumed. In this connection it is noted that the foregoing analysis is based on controlling a postage meter drum, which has a high moment of inertia, contributes high system friction, and calls for a cyclical start-stop mode of operation during which the load follows a predetermined displacement versus time trajectory to accommodate the maximum mailpiece transport speed in a typical mailing machine. Accordingly, the compensated system bandwidth $BW_c = 400$ radians per second may be chosen, as a result of which the overall system gain $K_o$ may be fixed at $K_o = 400$, and the value of $K_c$ may be calculated from the expression $K_c = K_o/(K_v)(K_a)(K_p)$. Since $f_z = f_1$, and $f_1$ and $f_p$ are also known, the Bode plot of the compensator D(S), FIG. 14, may be added to the Bode diagram (FIG. 13)

wherein the system compensator D(S) is shown as a dashed line.

Since the analog compensator D(S) was derived in the frequency domain, D(S) was converted to its Z-transform equivalent D(Z) in the sampled data domain for realization in the form of a numerical algorithm for implementation by a computer. Of the numerous well-known techniques for transforming a function in the frequency domain to a function in the sampled-data domain, the bi-linear transformation may be chosen. For bi-linear transformation purposes the Laplace operator S is defined by the expression shown in FIG. 16. Using the values $K_c=13.64$, $f_z=f_1=48$, and $f_p=3,400$ in the expression for D(S) shown in FIG. 14, and substituting the bilinear transformation expression for S shown in FIG. 16 and the sampling interval T=1 millisecond, in the expression shown in FIG. 14 results in the expression for D(Z) shown in FIG. 17. As shown in FIG. 11, $D(T)=$output/input$=g(T)/e(T)$, which, in the sampled data domain is expressed by the equation $D(Z)=G(Z)/E(Z)$. Accordingly, the expression for D(Z) shown in FIG. 17 may be rewritten as shown in FIG. 18a. Cross-multiplying the equivalency of FIG. 18a results in the expression shown in FIG. 18b, which defines the output G(Z) in the sampled data domain of the system compensator D(S). Taking the inverse Z-transform of the expression shown in FIG. 18b, results in the expression shown in FIG. 19 which defines the output $G(T_n)$ in the time domain of the system compensator D(S), and is a numerical expression of the algorithm to be implemented by the computer for system compensation purposes. As shown by the expression in FIG. 19 and in the following Table IV the output of the digital compensator for any current sampling instant $T_n$ is a function of the position error at the then current sampling time instant $T_n$, is a function of the position error at the end of the next previous sampling time instant $T_{n-1}$ and is a function of the algorithm output at the end of the next previous sampling time instant $T_{n-1}$.

TABLE IV

| Function | Definition |
|---|---|
| $G(T_n)$ | Algorithm output for current sampling time instant $T_n$ |
| $E(T_n)$ | Position error for current sampling time instant $T_n$ |
| $G(T_{n-1})$ | Algorithm output for next previous sampling time instant $T_{n-1}$ |
| $E(T_{n-1})$ | Position error for next previous sampling time instant $T_{n-1}$ |
| $K_1$, $K_2$ & $K_3$ | Constants of the compensated system which are a function of the parameters of the motor load and system friction for a sampling time period of T=1 millisecond. |

Accordingly, the algorithm which is to be implemented by the computer 500 for system compensation purposes is a function of a plurality of historical increments of sampled data for computing an input value for controlling a load to follow a predetermined position trajectory in a closed loop sampled-data servo-control system.

Inasmuch as the compensation algorithm was derived with a view to maximizing the closed-loop system bandwith for controlling the D.C. motor to drive the postage meter's worst case load, i.e., the postage meter's drum, the same compensation algorithm may be utilized for controlling the rotary value selection mechanism, or any other apparatus having mechanical, electro-mechanical or electrical loading characteristics of substantially the same magnitude as, or of lesser magnitude than the loading characteristics of the postage meter drum and associated drive transmission system at start-up, in a closed-loop, sampled data servo-control system. For example, as distinguished from controlling the drum 38 as a function of the sampled velocity of a mailpiece 16, the rack and print element selection members 472 and 478 of the rotary value selection mechanism 470 may each be controlled as a function of values representative of a predetermined, trapezoidal-shaped velocity versus time profile stored in the computer 500. Thus, a set of acceleration, deceleration and constant velocity constants may be conventionally stored in the computer 500 and fetched for calculating counts representative of the desired angular displacement of the motor output shaft 122 during each sampling time period T, for comparison with the counts representative of the actual angular displacement of the motor output shaft 122 during each sampling time period T. Correspondingly, any other set of acceleration, decceleration and constant velocity constants representative of any other trapezoidal-shaped velocity versus time profile of angular displacement of the motor drive shaft may be stored in the memory of the computer for use in controlling the linear displacement during each successive time period T of any portion of a given load, such as the pinion gear, a rack or print element, the periphery of the drum, or a given portion of the tape feeding mechanism or any other load.

Figure 20:
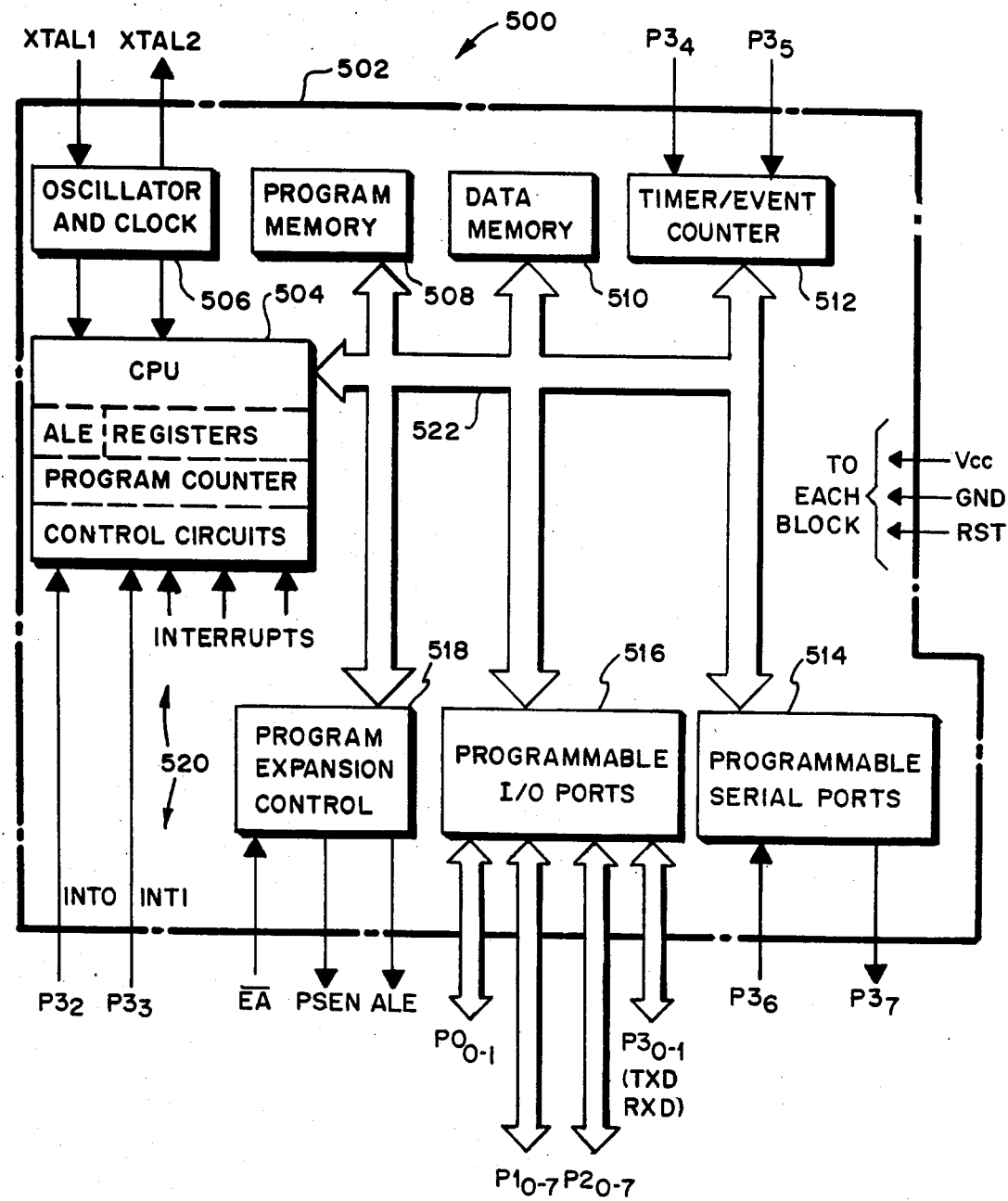
FIG. 20 is a block diagram of a preferred microprocessor for use in controlling the D.C. Motor.
Figures 1, 22A:
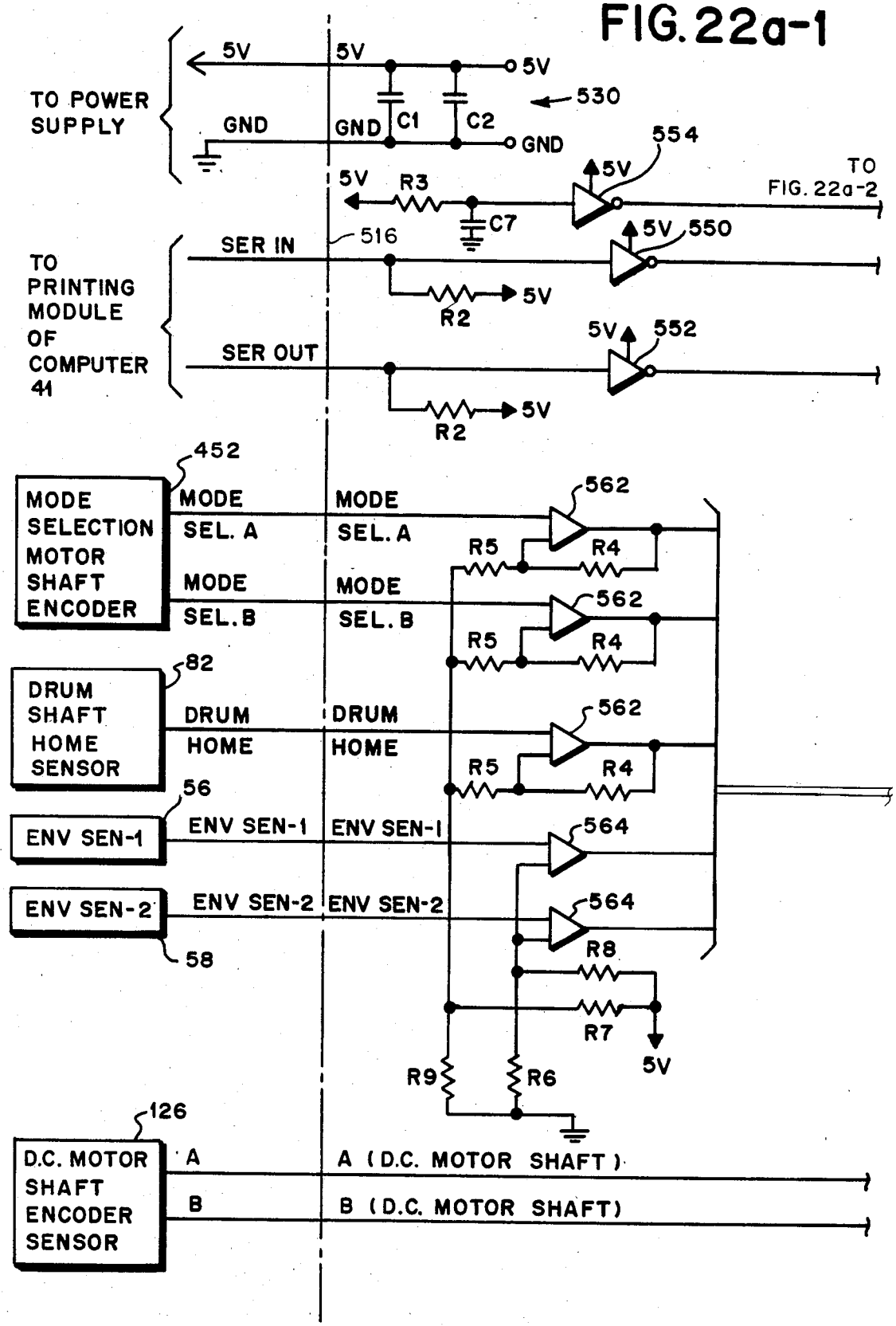
Figures 2, 22A:
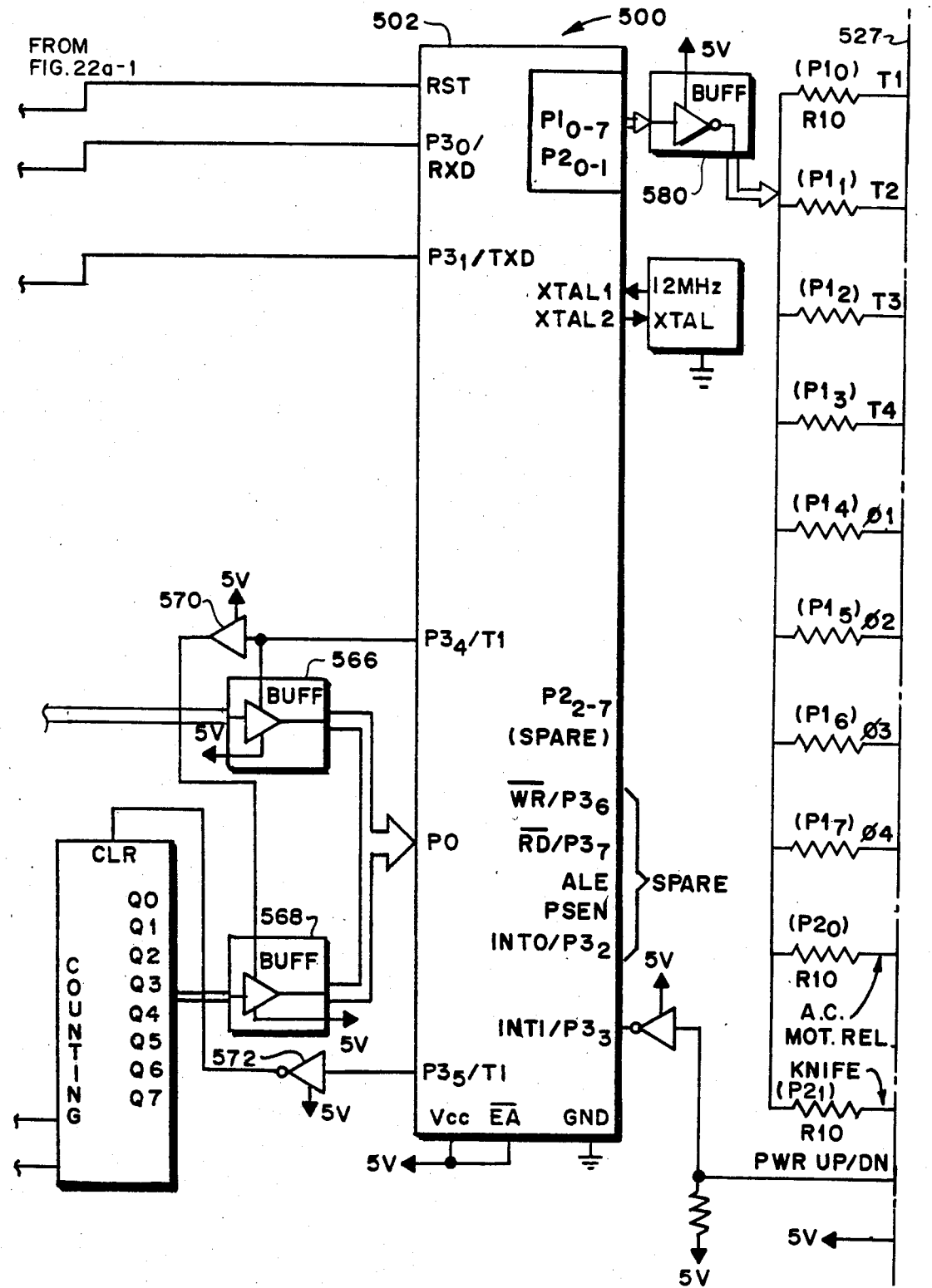
Figures 1, 22B:
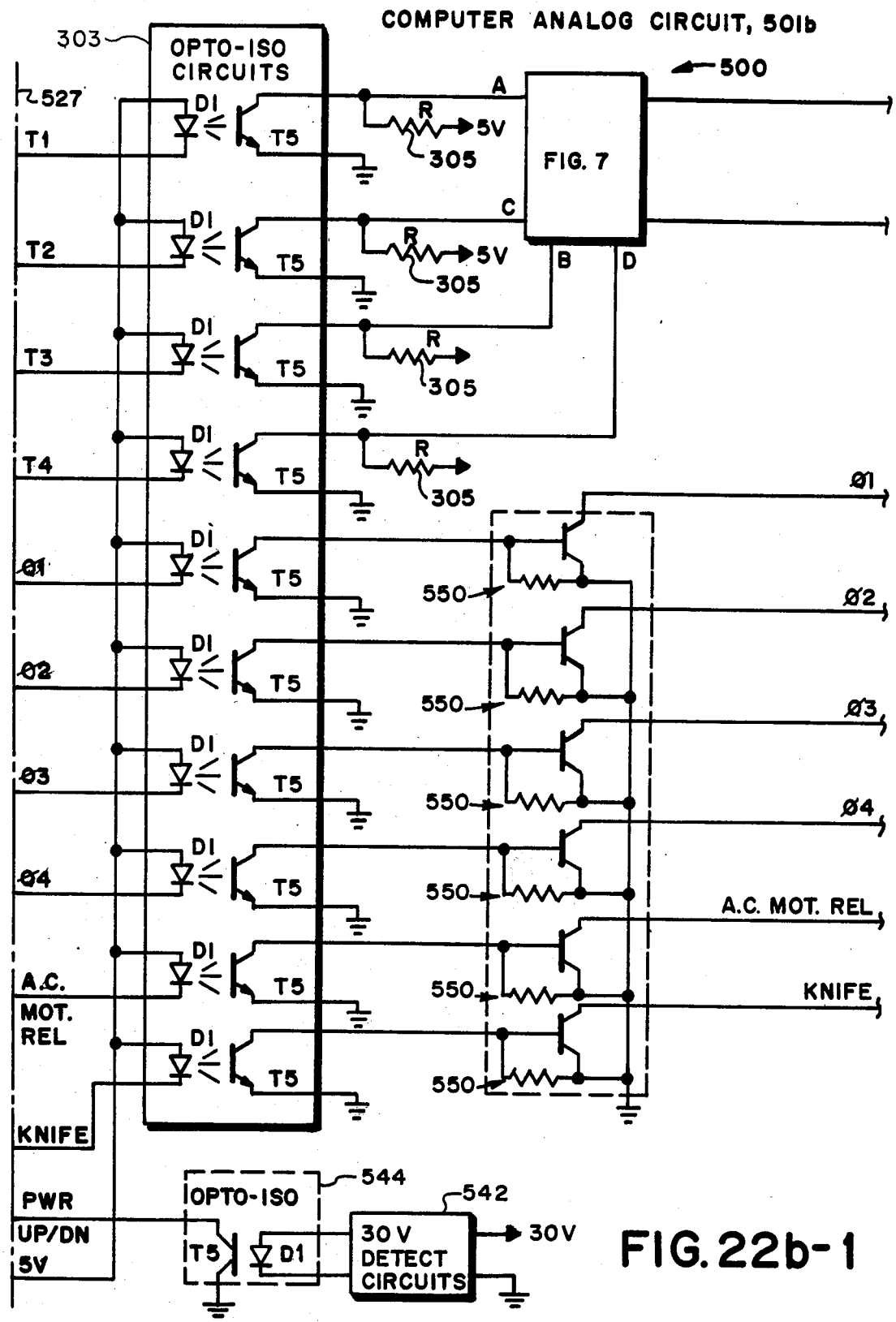
Figures 2, 22B:
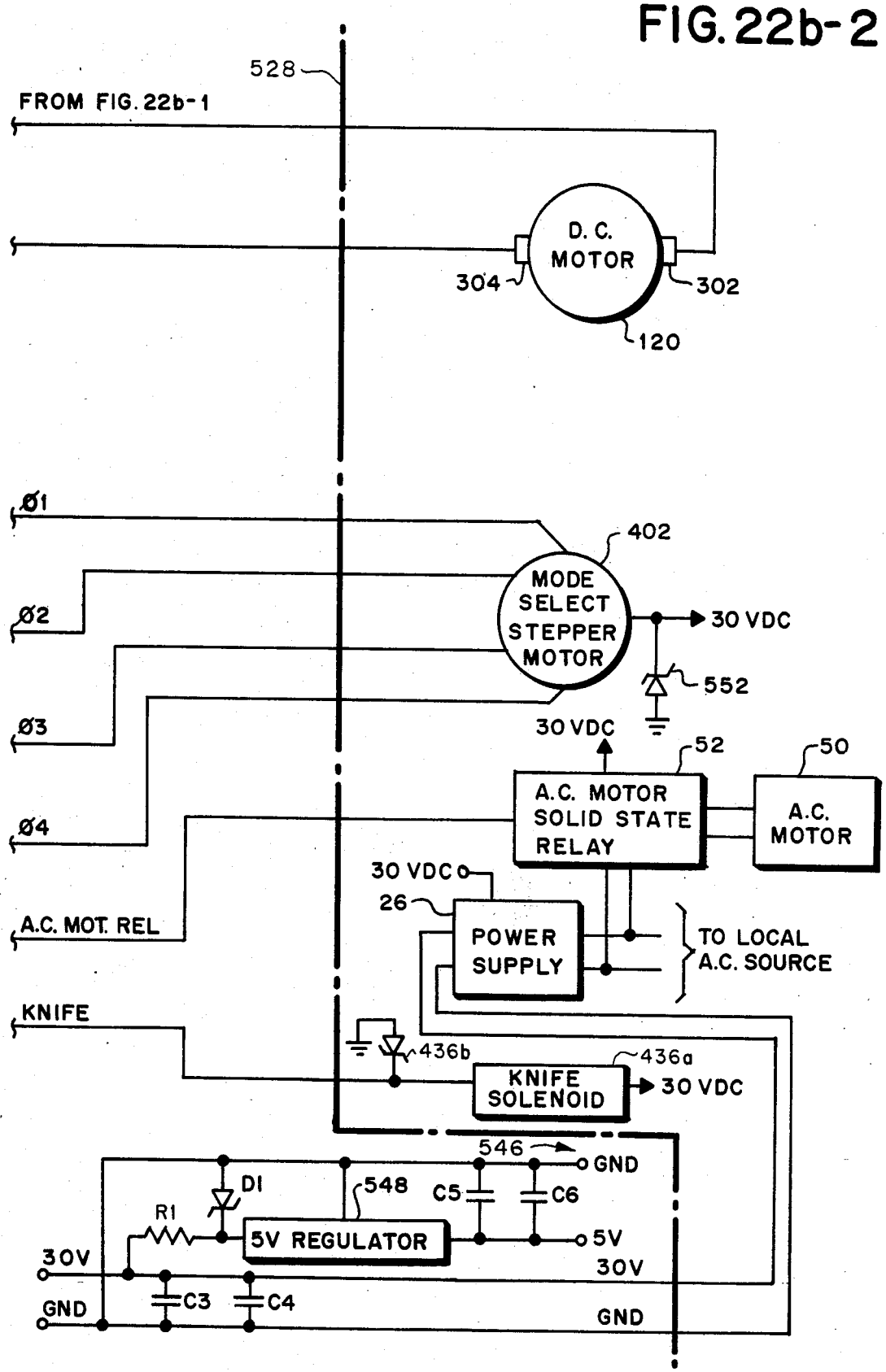

As shown in FIG. 20 the computer 500 preferably includes a conventional, inexpensively commercially available, high speed microprocessor 502, such as the Model 8051 single chip microprocessor commercially available from Intel Corporation, 3065 Bowers Avenue, Santa Clara, Calif. 95051. The microprocessor 502, generally comprises a plurality of discrete circuits, including those of a control processor unit or CPU 504, an oscillator and clock 506, a program memory 508, a data memory 510, timer and event counters 512, programmable serial ports 514, programmable I/O ports 516 and control circuits 518, which are respectively constructed and arranged by well known means for executing instructions from the program memory 508 that pertain to internal data, data from the clock 506, data memory 510, timer and event counter 512, serial ports 514, I/O ports 514 interrupts 520 and/or bus 522 and providing appropriate outputs from the clock 506, serial ports 514, I/O ports 516 and timer 512. A more detailed discussion of the internal structural and functional characteristics and features of the Model 8051 microprocessor, including optional methods of programming port 3 for use as a conventional bidirectional port, may be found in the Intel Corporation publication entitled MCS-51 Family of Single Chip Microcomputers Users Manual, dated January 1981.

For implementing the sampling time period of T=1 millisecond, one of the microprocessor's timer and event counters 512 (FIG. 20) is conventionally programmed as a sampling time period clock source. To that end, a timer 512 is programmed for providing an interrupt signal each 250 microseconds, and each successive fourth interrupt signal is utilized as a clock signal for timing the commencement of successive sampling time periods of T=1 millisecond.

In general, as shown in FIG. 21, at the commencement of each sampling time period of T=1 millisecond, during the sampling instant $T_n$, a sample is taken of the count representative of the actual angular displacement of the motor drive shaft and, substantially immediately thereafter, the actual count is summed with the count representative of the desired angular displacement of the motor drive shaft which was calculated during the next preceeding time period T in order to obtain the then current error value $E(T_n)$ for calculating the then current compensation algorithm output value $G(T_n)$. Due to the recursive mathematical expression for $G(T_n)$ [FIG. 19] being a function of the then current error value $E(T_n)$, the next previous error value $E(T_{n-1})$ and the next previous compensation algorithm output value $G(T_{n-1})$, the expression for $G(T_n)$ is preferably separated into two components for calculation purposes, i.e., $G(T_n)=g_1+g_2$; wherein $g_1=K_1\times E(T_n)$, and wherein $g_2=-[K_2\times E(T_{n-1})+K_3\times G(T_{n-1})]$, to permit calculation of the value of $g_2$ in advance of the time period T when it is to be added to the value of $g_1$ for calculating the value of $G(T_n)$, thereby reducing to a negligible value (in view of the time period T) the time delay $T_{dy}$ before completion of sampling the actual displacement of the motor drive shaft at the instant $T_n$ and applying the PWM motor control signal to the output ports of the microprocessor. For example, when calculating the value of $G(T_n)$ based upon the first error value resulting from the summation of the counts representing the desired and actual angular displacements of the motor drive shaft, the value of $g_2$ is by definition equal to zero since the error signal $E(T_{n-1})$ is equal to zero, due to the desired and actual angular displacement values during the next previous sampling time period T having been equal to each other. Accordingly, upon obtaining the value of the first error signal $E_1(T_n)$, the value of $G_1(T_n)$ may be calculated as being equivalent to $g_1$, i.e., $G_1(T_n)=g_1=K_1\times E_1(T_n)$. And, upon calculating $G_1(T_n)$ the value of $g_2$ for use in calculating the next successive compensation algorithm output value $G(T_{n+1})$ may be calculated for subsequent use, since $g_2(T_{n+1})=-[K_2\times E_1(T_n)+K_3\times G_1(T_n)]$, and $K_2$, $K_3$, $E_1(T_n)$ and $G_1(T_n)$ are all known values. In addition, during any given time period T, a calculation may be made of the desired angular displacement of the motor drive shaft for the next subsequent time period T. Preferably, the microprocessor is programmed for implementation of the aforesaid calculation process to facilitate early utilization of the compensation algorithm output value $G(T_n)$ for driving the D.C. motor. Accordingly, the microprocessor is preferably programmed for: during the first sampling time period $T_1$, sampling the count representative of the actual angular displacement of the motor drive shaft at the time instant $T_n$, then taking the summation of that count and the previously calculated value of the desired angular displacement of the motor drive shaft to obtain the first error value $E_1(T_n)$, then calculating the first compensation algorithm output value $G_1(T_n)=K_1\times E_1(T_n)+g_2$, wherein $g_2=0$, and generating a PWM motor control signal representative of $G_1(T_n)$, then calculating the value of $g_2$ for the next sampling time period, i.e., $g_2=-[K_2\times E_1(T_n)+K_3\times G_1(T_n)]$, and then calculating the count representing the desired angular displacement of the motor drive shaft for use during the next sampling time period $T_2$; during the second sampling time period $T_2$, sampling the count representative of the actual angular displacement of the motor drive shaft and taking the summation of that count and the previously calculated desired count to obtain the error value $E_2(T_{n+1})$, calculating the compensation algorithm output value $G_2(T_{n+1})=K_1\times E_2(T_{n+1})+g_2=K_1\times E_2(T_{n+1})-K_2\times E_1(T_n)-K_3\times G_1(T_n)$, and generating a PWM motor control signal representative thereof, then calculating the value of $g_2$ for the next sampling time period $T_3$, i.e., $g_2-[K_2\times E_2(T_{n+1})+K_3\times G_2(T_{n+1})]$, and then calculating the count representative of the desired angular displacement of the motor drive shaft for use during the time period $T_3$; and so on, during each successive sampling time period.

Accordingly, as shown in FIG. 21, the microprocessor is programmed for immediately after calculating the then current compensation algorithm output value $G(T_n)$, and thus while the calculation of the value of $g_2$ for the next sampling time period is in progress, generating a motor control signal for energizing the power amplifier. For this purpose, the relative voltage levels of motor control signal are determined by the sign, i.e., plus or minus, of the compensation algorithm output value $G(T_n)$, and the duty cycle of the control signal is determined by the absolute value of the compensation algorithm output value $G(T_n)$. Preferably, for timing the duration of the motor control signal, the other timer and event counter 512, i.e., the timer 512 which was not used as a sampling time period clock source, is utilized for timing the duration of the duty cycle of the motor control signal. For example, by loading the absolute value of the $G(T_n)$ into the other timer 512, commencing the count, and timely invoking an interrupt for terminating the duty cycle of the control signal. As shown in FIG. 21(c), the time delay $T_{dy}$ from commencement of the time period T to updating the PWM motor control signal at the output ports of the microprocessor is substantially 55 microseconds, and the time interval allocated for calculating the value of $g_2$ and the count representative of the desired angular displacement of the motor drive shaft for use during the next time period is substantially 352 microseconds. As a result, substantially 593 microseconds of microprocessor calculation time is available during any given sampling time period $T=1$ millisecond for implementing non-motor control applications.

As shown in FIG. 22 the computer 500 is preferably modularly constructed for segregating the components of the logic circuit 501a and analog circuit 501b of the computer 500 from each other. To that end, the respective circuits 501a and 501b may be mounted on separate printed circuit boards which are electrically isolated from each other and adapted to be interconnected by means of connectors located along the respective dot-dash lines 516, 527 and 528. In any event, the components of the logic circuit 521a and analog circuit 521b are preferably electrically isolated from each other. To that end, the logic circuit 501a preferably includes 5 V and ground leads from the mailing machine's power supply for providing the logic circuit 501a with a local 5 volt source 530 having 5 V and GND leads shunted by filter capacitors C1 and C2. And the analog circuit 501b includes 30 volt and ground return leads from the mailing machine's power supply for providing the analog circuit 501b with a local 30 volt source 536 including 30 V and GND leads shunted by filter capacitors C3 and C4. In addition, the analog circuit 501b includes a conventional 30 volt detection circuit 542 having its input conventionally connected to the analog circuit's 30 volt source 536, and its output coupled to a power up/down lead from the analog circuit via a conventional optical-electrical isolator circuit 544. Further, to provide the analog circuit 501b with a local 5 volt source 546, the analog circuit 501b is equipt with a conventional regulated power supply having its input appropriately connected to the analog circuit's 30 volt source 536 via a series connected resistor R1 and a 5 volt, voltage regulator 548. A zener diode D1, having its cathode shunted to ground and having its anode connected to the input of the 5 V regulator 548 and also connected via the resistor R1 to the 30 volt terminal line, is provided for maintaining the input to the 5 V regulator 548 at substantially a 5 volt level. In addition, a pair of capacitors C5 and C6 are provided across the output of the regulator 548 for filtration purposes.

To accommodate interfacing the postage meter's computer 41 (FIG. 1) with the computer 500, any two available ports of the computer 41 may be programmed for two-way serial communications purposes and conventionally coupled to the computer 500. For example, the postage meter's printing module 41c may be conventionally modified to include an additional two-way serial communications channel for communication with the computer 500. Assuming the latter arrangement, serial input communications to the computer 500 (FIG. 22) are received from the postage meter computer's printing module 41c via the serial input lead to the logic circuit 501a (FIG. 22), which is operably coupled to port $P3_0$ of the microprocessor 502 by means of a conventional inverting buffer circuit 550. Accordingly, port $P3_0$ is preferably programmed for serial input communications, and the input to the buffer circuit 550 is resistively coupled to the logic circuit's 5 volt source 530 via a conventional pull-up resistor R2. Serial output communications from the microprocessor 502 are transmitted from port $P3_1$. Accordingly, port $P3_1$ is preferably programmed for serial output communications, and is operably coupled to the input of a conventional inverting buffer 552, the output of which is resistively coupled to the logic circuit's 5 V source 530 via a suitable pull-up resistor R2 and is additionally electrically connected to the serial output lead from the logic circuit 501a.

Since it is preferable that the microprocessor 502 be reset in response to energization of the logic circuit 501a, the logic circuit's 5 V source 530 is connected in series with an R-C delay circuit and a conventional inverting buffer circuit 554 to the reset pin, RST, of the microprocessor 502. The R-C circuit includes a suitable resistor R3 which is connected in series with the logic circuit's local 5 V source 530 and a suitable capacitor C7 which has one end connected between the resistor R3 and the input to the buffer circuit 554, and the other end connected to the logic circuit's ground return.

In addition to the VCC and GND (i.e., VSS) terminals of the microprocessor 502 being respectively conventionally connected to the logic circuit's 5 volt source and ground, since the microprocessor 502 does not utilize an external program memory, the $\overline{EA}$ terminal is connected to the logic circuit's 5 V source. And, since no other external memory is used, the program storage enable and address latch enable terminals, PSEN and ALE are not used. In addition to the $\overline{EA}$ terminal being available for future expansion, ports $P2_2$–$P2_7$, the read and write terminals, $\overline{RD}$ and $\overline{WR}$, and one of the interupt terminals INT0/$P3_2$ are also available for future expansion.

In general, the microprocessor 502 is programmed for receiving input data from the postage meter drum's home position encoder 82 each of the envelope sensors 56, 58, the mode selection stepper motor's output shaft encoder 452 and the D.C. motor shaft encoder 126, and, in response to a conventional communication from the postage meter's printing module 41c, timely energizing the mode selection stepper motor 402 the D.C. motor and knife solenoid under control of the microprocessor 502. Port P0 is programmed for receiving a signal representative of the disposition of the postage meter's drum 38 at its home position; transition signals from the envelope sensors 56 and 58 which represent detection of the leading edge of a mailpiece or other sheet 16 being fed to the drum 38 to permit calculation by the computer 500 of the velocity of the mailpiece and desired angular displacement of the D.C. motor shaft 122 and thus the drum 38; transition signals representative of the disposition of the D.C. motor drive gear 124; and a count representative of the actual angular displacement of the D.C. motor shaft 122. Preferably, port P0 is multiplexed to alternately receive inputs from groups of the various sensors, under the control of an output signal from Port $P3_4$ of the microprocessor 502. The stepper motor shaft encoder 452, which is utilized for sensing the home position of the output shaft 402 of the mode selection stepper motor 402, and thus the home position of the D.C. motor drive gear 124, and also for sensing the relative position of the drive gear 124 with respect to the various power transfer gears 90, 430, 432 and 434, is coupled to the computer 500 via the respective mode select leads A and B of the logic circuit, which, in turn, are each connected to one input of another differential amplifier 562, the output of which is connected to the other input of the differential amplifier 562 via a feedback resistor R4. Correspondingly, the shaft encoder 82, which is utilized for sensing the home position of the postage meter drum 38, is coupled to the computer 500 via the drum home position lead. The aforesaid other input to each of the amplifiers 562 are each resistively coupled, by means of a resistor R5, to the mid-point of a voltage divider circuit including resistors R6 and R7. Resistors R6 and R7 are connected in series with each other and across the logic circuit's 5 V source and ground return leads. The LED sensors 56 and 58, which are utilized for successively sensing the leading edges of each envelope being fed by the letter transport, are separately coupled to the computer 500 via the envelope sensor-1 and envelope sensor-2 input leads of the logic circuit 501a. In the logic circuit 501a, the envelope sensor-1 and sensor-2 leads are connected on a one-for-one basis to one of the inputs of a pair of conventional amplifiers 564, the other inputs of which are connected together and to the mid-point of a voltage divider including resistors R8 and R9. Resistors R8 and R9 are connected in series with each other and across the logic circuit's 5 V source and ground return leads. Further, the five output signals from the three differential amplifiers 562 and the two amplifiers 564 are connected on a one-for-one basis to the five input ports $P0_{0-4}$ of the microprocessor 502, each via a conventional tri-state buffer circuit 566, one of which is shown. The input signals A and B from the D.C. motor shaft encoder 126 are coupled to the logic circuit 501a by means of leads A and B, which are conventionally electrically connected to the counting circuit 270 to provide the microprocessor 502 the the count representative of the actual angular displacement of the motor shaft 122 from its home position. The counting circuit's leads Q0–Q7 are electrically connected on a one-forone basis to Ports $P0_0$–$P0_7$ of the microprocessor 502 via one of eight conventional tri-state buffer circuits 568, one of which is shown, having their respective control input leads connected to each other and to the output of a conventional inverting buffer circuit 570, which has its input conventionally connected port $P3_4$ of the microprocessor 502. Thus, either the five input signals, i.e., two from the shaft encoder of the mode selection stepper motor, one from the drum home position sensor and two from the envelope position sensors, are operably electrically coupled to ports $P0_0$–$P0_4$ of the microprocessor 502, or the eight input signals Q0–Q7 from the counter circuit 270 are operably electrically coupled to ports $P0_0$–$P0_7$ of the microprocessor 502, for scanning purposes, in response to an appropriate control signal being applied to the respective buffer circuits 566 and 568 from port $P3_4$ of the microprocessor 502. In operation, assuming a low logic level signal is required for activating either of the sets of buffers 566 or 568; when the microprocessor 502 applies such a signal to port $P3_4$, the buffer circuits 566 operate, whereas since the buffer circuit 570 inverts this signal to a high logic level signal before applying the same to the buffer circuit 568, the latter is inoperative. Conversely, a high logic level signal from port $P3_4$ will operate buffer circuits 568 and not operate the buffer circuits 566. Accordingly, depending upon the level, high or low, of the signal from port $P3_4$ of the microprocessor 502, the eight bit input to one or the other buffer circuits 566 or 568 will be made available to port PO for scanning purposes Aside from the foregoing, to permit the microprocessor 502 to clear the counter 270 for any reason in the course of execution of the program, port $P3_5$ is connected to the clear pin CLR of the counter 270 via a conventional inverting buffer 572, and the microprocessor 502 is programmed for timely applying the appropriate signal to port $P3_5$ which, when inverted, causes the counting circuit 270 to be cleared.

Figure 7:
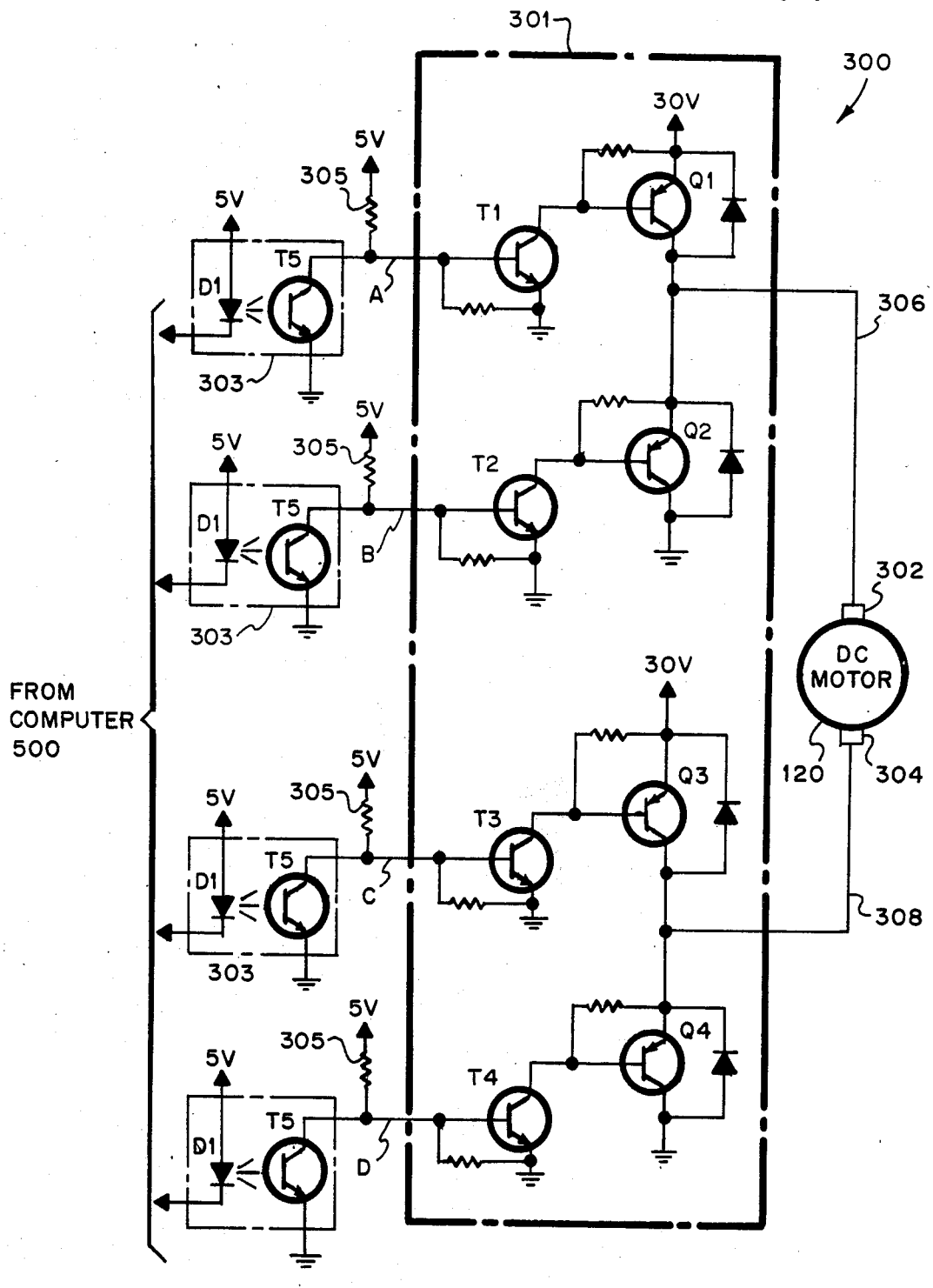
FIG. 7 shows a power amplifier circuit for coupling the computer to the D.C. motor.
Figures 8, 9:
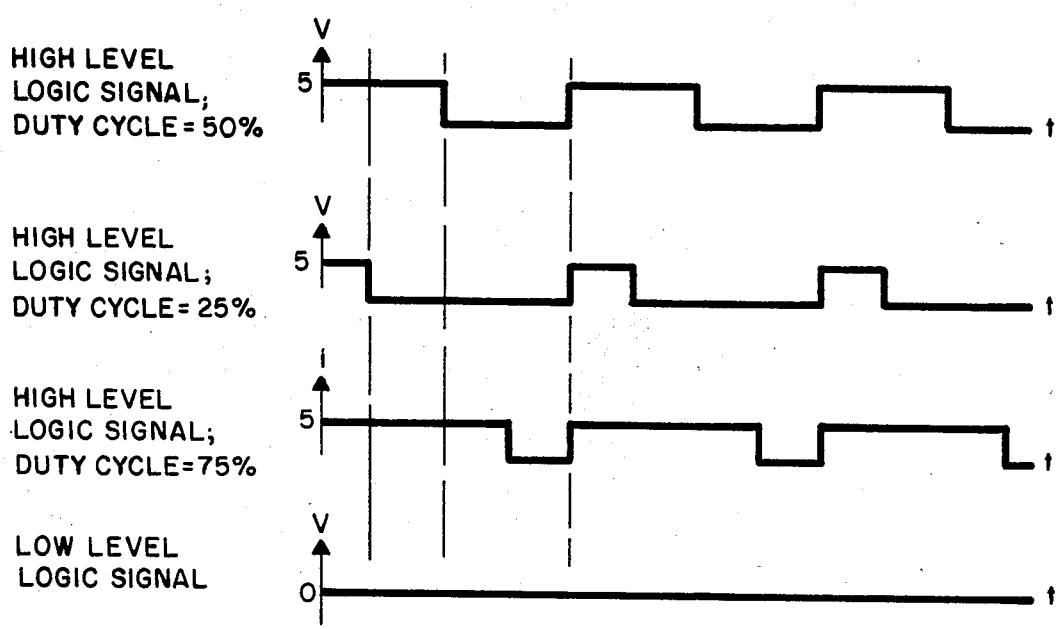
FIG. 8 is a ruth table showing the status of the transistors in the power amplifying circuit for clockwise and counter-clockwise rotation of the D.C. motor.
FIG. 9 shows the relationship between the encoder output signals for various D.C. motor duty cycles.

In general, ports $P1_0$–$P1_3$ are utilized by the microprocessor 502 for providing pulse width modulated (PWM) motor control signals for controlling energization of the D.C. motor 120, ports $P1_4$–$P1_7$ are utilized for providing stepper motor control signals for controlling energization of the mode selection stepper motor 402, port $P2_0$ is utilized for controlling energization of the solid state, A.C. motor, relay 52 and thus operation of the mailpiece conveyor 49, and port $P2_1$ is utilized for timely operating the knife solenoid 436a. To that end, ports $P1_0$–$P1_7$ and port $P2_0$ of the microprocessor 502 are each conventionally electrically connected on a one-for-one basis to the input of a conventional inverting buffer circuit 580, one of which is shown. The outputs of each of the buffer circuits 580 are connected on a one-for-one basis, via a conventional resistor R10, to output leads from the logic circuit 501b, one of which is designated solid state, A.C. motor, relay, four of which are designated $\phi1$, $\phi2$, $\phi3$ and $\phi4$ to correspond to the four phases of the stepper motor 402, and four of which are respectively designated T1, T3, T2 and T4, since, as shown in FIG. 7, the four preamplifier stages of the power amplifier utilized for driving the D.C. motor 120 include the transistors T1–T4. Thus, one nibble of the signal from port P1 is utilized for controlling energization of the D.C. motor, the other nibble from port P1 controls energization of the mode selector stepper motor 402, a one bit signal from port $P2_0$ controls energization of the solid state, A.C. motor, relay 52 and thus the A.C. motor 50, and a one bit signal from port $P2_1$ controls operation of the knife solenoid 436a. In the analog circuit 501b, each of the leads T1, T2, T3, T4, $\phi1$, $\phi2$, $\phi3$, $\phi4$, relay and solenoid leads from the logic circuit 501a, is electrically connected on a one-for-one basis to the anode of the light emitting diode D1 of ten, conventional, photo-transistor type, optical-electrical isolator circuits 303. Since the cathodes of the light emitting diodes D1 of the opto-isolator circuits 303 are connected to each other and to the 5 volt lead from the analog circuit 501b which extends to the 5 volt source of the logic circuit 501a, the motor control signals are isolated from the power system of the analog circuit 501b to avoid having spurious noise signals in the analog circuit 501b and its components interfere with the control signals generated by the microprocessor 502. The analog circuit 501b also includes a lead, designated power up/down, which extends from the analog circuit 501b to the logic circuit 501a and is connected to the microprocessor's interrupt INTI, port $P3_3$, to provide the microprocessor 502 with an appropriate input signal when the power is turned on, off or fails. In the analog circuit 501b, the power up/down lead from the logic circuit 501a is coupled to the thirty volt detect circuit 542 by means of a conventional opto-isolator 544, the power up/down lead being electrically connected to ground through collector-emitter circuit of the opto-isolator's photo-transistor when the light emitting diode D1 is lit in response to the D.C. supply voltage level matching the internal reference voltage level, e.g., 30 volts, of the 30 volt detection circuit.

In the analog circuit 501b each of the four outputs from the photo-transistors of each of the opto-isolators 303 associated with the D.C. motor control leads T1, T2, T3 and T4 are resistively coupled to the analog circuits 5 V source by means of a conventional pull-up resistor 305, and the emitters of the photo-transistors T5 are connected to the analog circuit's ground system. In addition, the collectors of the photodiodes of the opto-isolators 303, which are utilized for transmitting the D.C. motor control signals from ports $P1_0$–$P1_3$ of the microprocessor 502 are connected on a one-for-one basis to the appropriate input leads A, B, C and D of the power amplifiers shown in FIG. 7, the outputs of which are connected to the D.C. motor 120. Further, each of the four onputs from the photo-transistor of each of the opto-isolators 303 associated with the stepper motor control leads $\phi1$, $\phi2$, $\phi3$, and $\phi4$ are respectively connected to the input lead a conventional darlington-type power amplifier 550, the resepctive outputs of which are connected on a one-for-one basis via the appropriate phase, i.e., $\phi1$, $\phi2$, $\phi3$, or $\phi4$ of the mode selector stepper motor 402 to the mailing machine's 30 volt D.C. source, which is preferably conventionally shunted to ground by means of an appropriately poled zener diode 552 to provide a sink for excess current from the stepper motor phase coils. In addition, the respective collectors of the photodiodes of the opto-isolators 303 utilized for transmitting the signals from ports $P2_0$ and $P2_1$ for controlling the relay 52 and solenoid 436a are each connected to the input lead of other conventional darlington-type power amplifiers 550, the outputs of which are each conventionally connected to the mailing machine's 30 volt D.C. source via the relay 52 or solenoid 436a. In addition, a zener diode 436b is provided for dissipating the reverse current of the solenoid 436a.

Figure 23A:
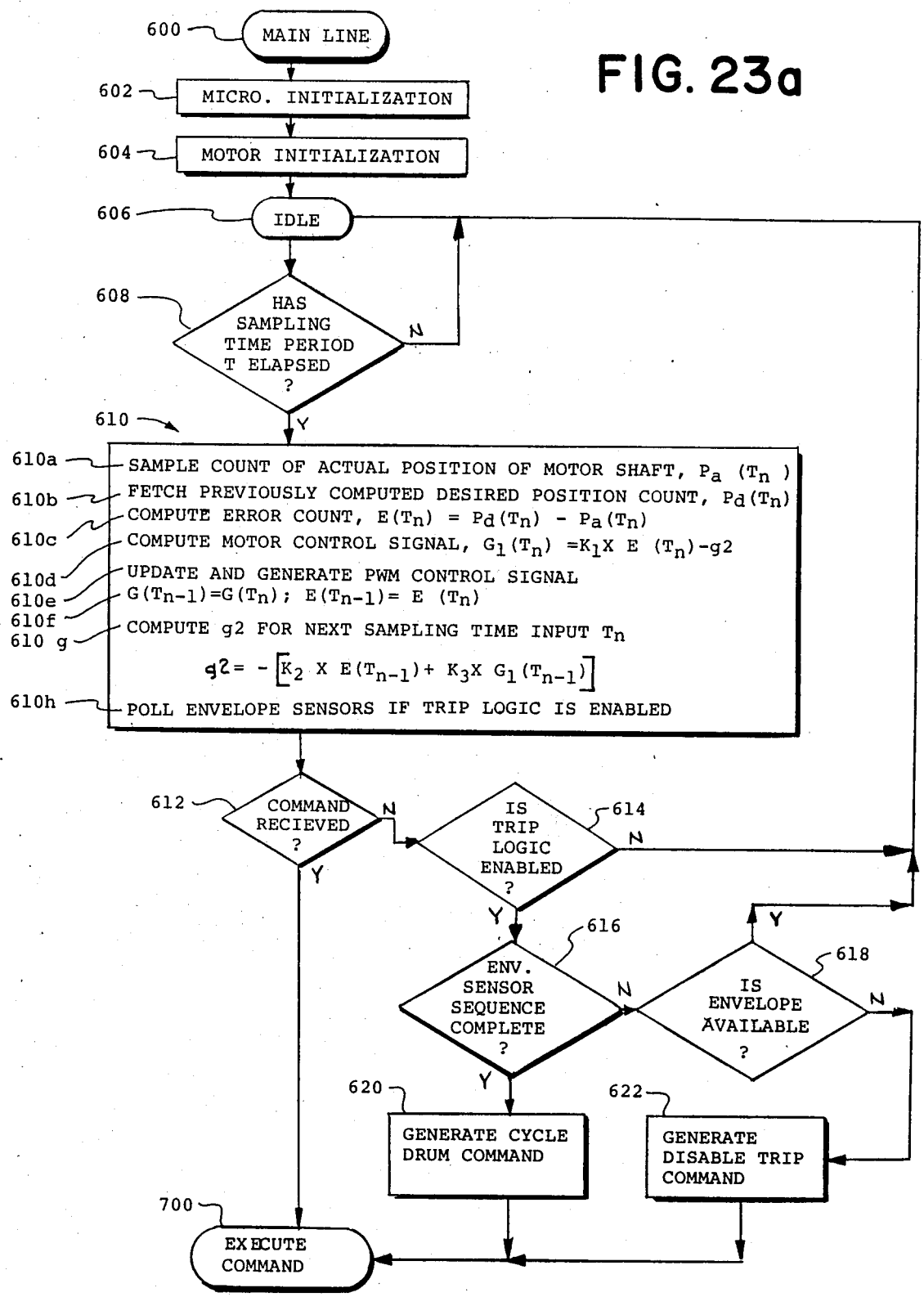
FIG. 23 (including FIGS. 23a, 23b, 23c, 23d and 23e) shows the flow charts portraying the processing steps of the computer.
Figures 2, 23B:
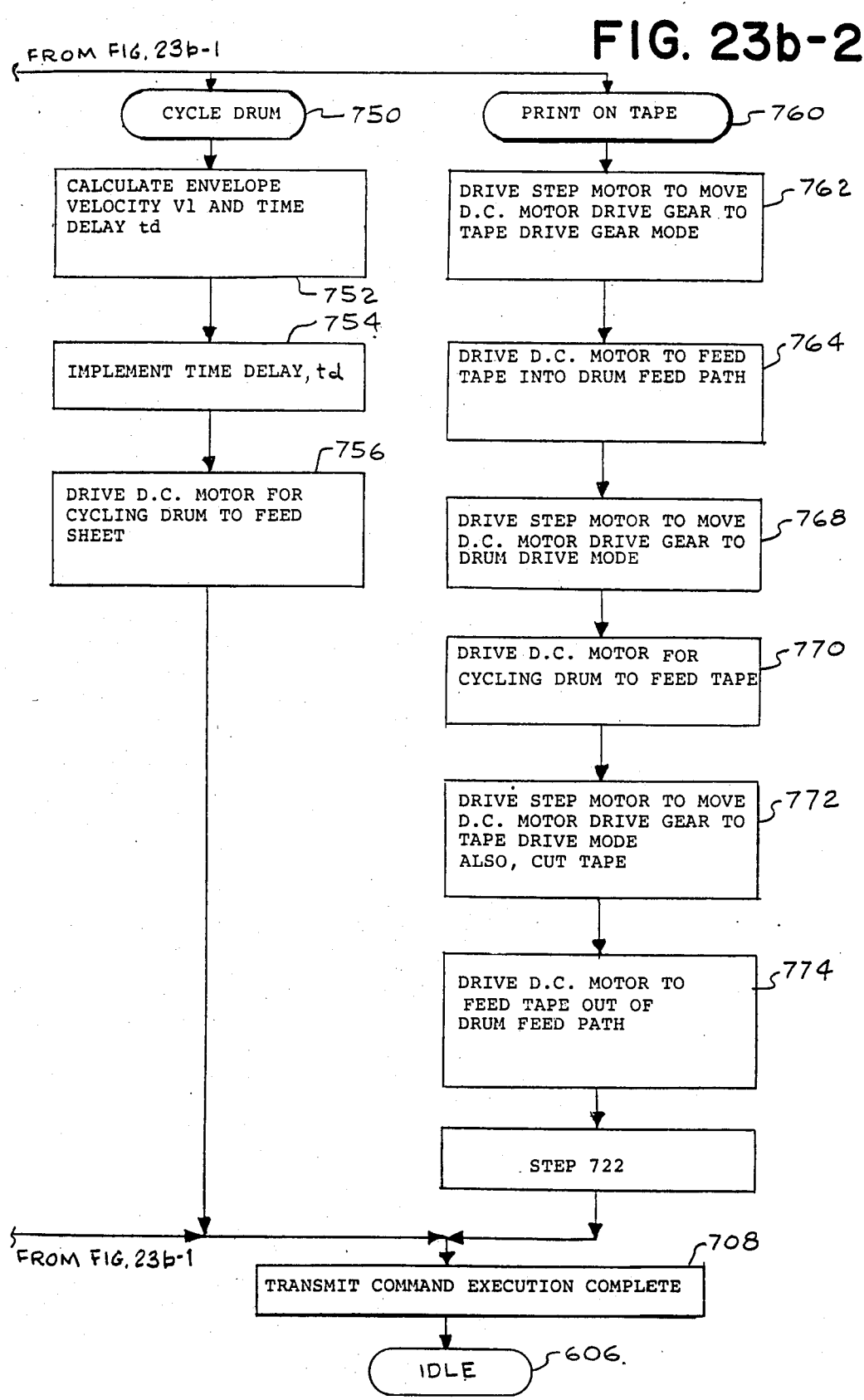
Figure 23C:
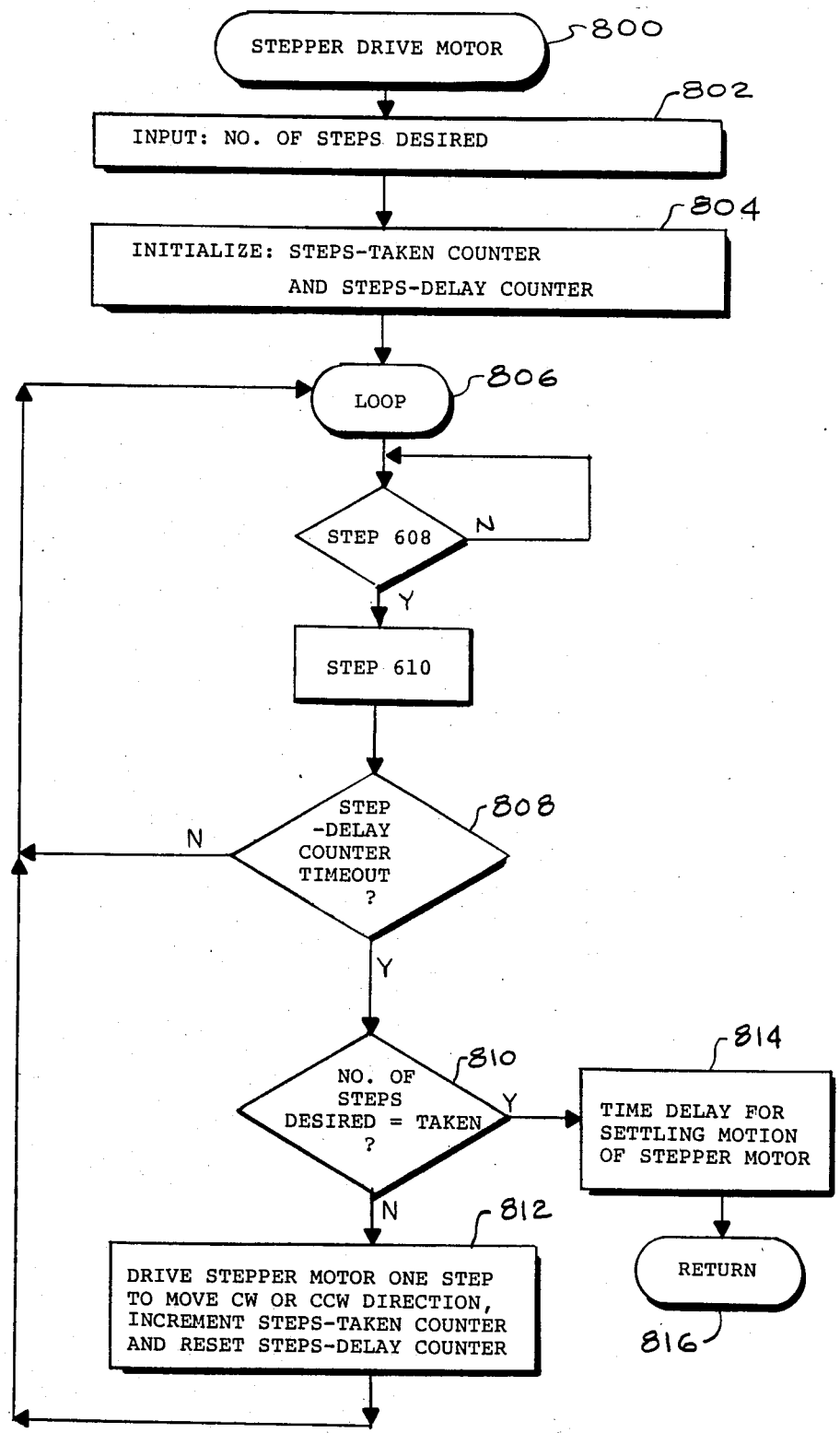
Figure 23E:
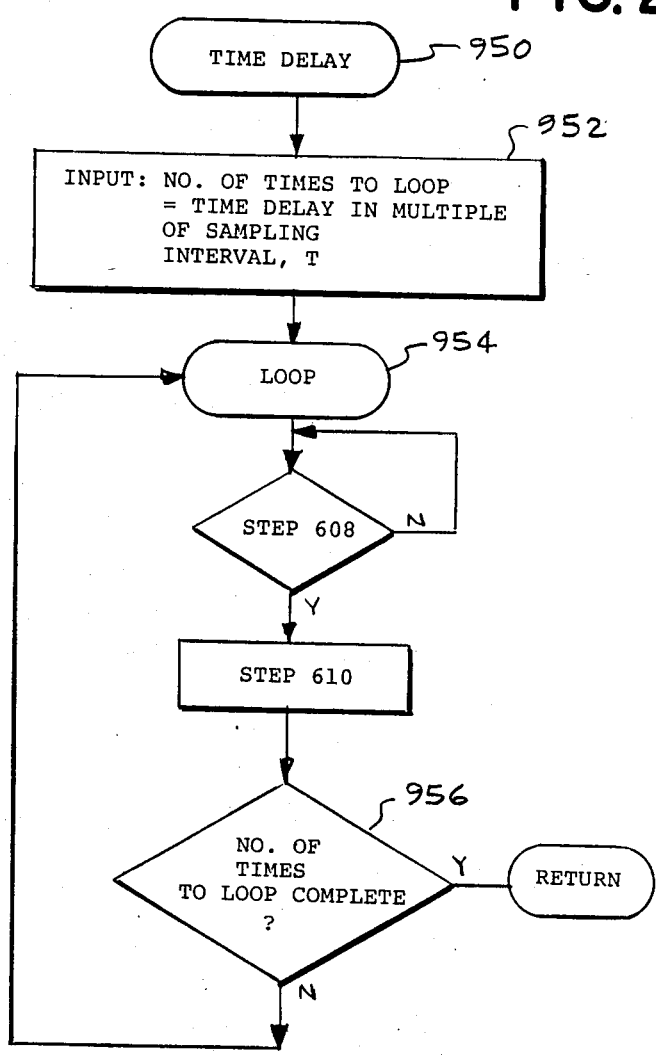

In general, the computer 500 includes five software programs, including a main line program, FIG. 23a, a command execution program, FIG. 23b, a stepper motor drive subroutine, FIG. 23c, a d.c. motor drive subroutine, FIG. 23d, and a time delay subroutine, FIG. 23e. When the mailing machine 10 is energized by actuation of the main power switch 24, the resulting low level logic signal from D.C. supply is applied to the reset terminal RST of the computer's microprocessor 502, thereby enabling the microprocessor 502. Whereupon, as shown in FIG. 23a, the microprocessor 502 commences execution of the main line program 600.

The main line program 600 (FIG. 23a) commences with the step of conventionally initializing the microprocessor 602, which generally includes establishing the initial voltage levels at the microprocessor's ports, and interrupts, and setting the timers and counters. Thereafter, the mode selector stepper motor and D.C. motor drive unit are initialized 604. Step 604 entails scanning the microprocessor's input port $PO_0$, to determine whether or not the mode selector stepper motor and D.C. motor shafts, 122 and 404 are located in their respective home positions and, if not, driving the same to their respective home positions. Assuming the motor shafts 122 and 404 are so located, either before or after the initialization step 604, the program then enters an idle loop routine 606.

In the idle loop routine 606, a determination is initially made as to whether or not the sampling time period of T=1 millisecond has elapsed, step 608, it being noted that each successive sample is taken at the time instant $T_n$ immediately after and in response to the fourth 250 millisecond interrupt generated by the timer utilized for implementing the sampling time period T. Assuming the time period T has not elapsed, the program loops to idle 606. On the other hand, assuming the time period T has elapsed, the microprocessor 502 updates the servo-control system, step 610. For the purpose of explaining step 610 it will be assumed that the desired location of the motor drive shaft 122 is the home position. Step 610 includes the successive steps 610a and 610b, respectively, of sampling the count of the actual position Pa of the motor drive shaft 122 at the sampling time instant $T_n$, and fetching the previously computed count representing the desired position Pd of the shaft 122 at the same sampling time instant $T_n$. If for any reason the motor drive shaft 122 is not located in its home position when the value of the desired position count $Pd(T_n)$ is representative of the home position location, then the values of $Pa(T_n)$ and $Pd(T_n)$ will be different. On the other hand, if the motor drive shaft 122 is located in its home position when the desired position count $Pd(T_n)$ is representative of the home position location, then the values of $Pa(T_n)$ and $Pd(T_n)$ will be the same. Accordingly, computation of the error count, 610c, may or may not result in an error count value $E(T_n)$ of zero. Further, independently of the computed value of $E(T_n)$, the computed value $G(T_n)$ of the motor control signal, step 601d, may or may not result in a value of $G(T_n)$ of zero; it being noted that although step 610c results in a computed value of $E(T_n)=0$, the value of $g_2$ may not be equal to zero due to the computed value of the error for the next previous sampling time instant $E(T_{n-1})$ having resulted in a non-zero value, step 610g. Assuming steps 610c and 610d both result in zero value computations, then, upon updating and generating the PWM motor control signal, step 610e, no motor control signal will be generated. Under any other circumstances, step 610e will result in generating a PWM motor control signal for driving the D.C. motor 120, and thus the drum 38, to its home position. Thereafter, as shown in step 610f, the computed values of $E(T_n)$ and $G(T_n)$ are utilized as the values of $E(T_{n-1})$ and $G(T_{n-1})$ respectively for pre-calculating the value of $g_2$ for the next subsequent time instant $T_n$.

Thereafter, as shown in step 610h, the envelope sensors 56 and 58 are polled if the trip logic is enabled, i.e., if an envelope 16 is to be fed to the drum 38. However for the purpose of this discussion it will be assumed that an envelope is not being fed, as a result of which the trip logic is not enabled and, therefore, the envelope sensors 56 and 58 are not polled, step 610h. As shown by the next, step 612, a determination is then made as to whether or not a command has been received. Assuming a command has not been received, step 612, since trip logic is not enabled, processing returns to idle 606. Thus, until a command is received from the postage meter's computer 41, the main line program will continuously loop through steps 608, 610, 612 and 614 and drive the motor drive shaft 122 to its home position, against any force tending to move the shaft 122 out of the home position.

At this juncture, it will be assumed that a command is received, as a result of which the inquiry of step 612 (FIG. 23a) is answered affirmatively, and the execute command routine 700 (FIG. 23b) is invoked.

Assuming the command to be executed is to select postage, the select postage routine 702 (FIG. 23b) is invoked. Processing thus commences with the step, 704, of decoding the postage value, followed by an inquiry as to whether or not a digit is to be changed, step 706, in order to print the selected postage value. Assuming none if the print wheels 464 (FIG. 1 and FIG. 23b) are to be rotated in order to locate a different print element 465 at the periphery of the postage meter's drum 38, then the inquiry of step 706 is answered negatively, and an appropriate message is transmitted to the postage meters computer 41 to indicate completion of execution of the command, step 708 before the select postage routine 702 loops to idle 606 (FIG. 23a). On the other hand, if any print element 465 of any print wheel 464 is to be changed in order to print the selected postage value, the inquiry of step 706 is affirmatively answered. Whereupon the mode selector stepper motor 402 is energized under the control of the computer 500 to move the D.C. motor's drive gear 124 to the rack select mode of operation, step 710, wherein the gear 124 is disposed in meshing engagement with both of the transfer gears 430 and 432. Step 710 generally includes the step of calling up and executing the steps of the stepper motor drive subroutine 800 (FIG. 23c).

The stepper motor drive subroutine 800 (FIG. 23c), which is called up by the execute command routine 700 whenever the stepper motor 402 is to be driven, includes the initial step, 802, of fetching a count corresponding to the number of steps through which the stepper motor 402 is to be driven in order to move the d.c. motor's drive gear 124 from its then current position to the desired drive position for command execution purposes which, in the case of execution of the select postage command calls for initially positioning the drive gear 124 in the rack select mode and thus in engagement with the transfer gears 430 and 432. Thereafter processing proceeds to the step, 804, of initializing a steps-taken taken counter, for counting the number of steps through which the stepper motor 402 is driven, and of initializing a step-delay counter, which acts as a clock for providing a fixed time delay, i.e., a multiple of the sampling time period T, between each step through which the stepper motor 402 is driven, in view of the performance specifications of the stepper motor being utilized. Thereafter, the microprocessor 502 executes the steps of the loop 806, including the initial steps of waiting for the next elapse of a sampling time period T, step 608 as previously discussed, updating the d.c. motor servo control drive system, step 610 and then inquiring as to whether or not the step-delay counter has timed out, step 808. Assuming the step-delay counter has not timed out, processing of steps 608, 610 and 808 of the loop 806 is continuous until the step-delay counter times out, step 808. Whereupon the microprocessor 502 implements the step, 810, of inquiring whether or not the number of steps through which the stepper motor 402 has been driven is equal to the desired number of steps. Assuming that the number of steps taken is not equal to the desired number of steps, then, the microprocessor 502 updates the stepper motor drive, step 812, which includes the steps of driving the stepper motor 402 through one step, either clockwise or counter-clockwise depending on the then current position of the d.c. motor drive gear 124 relative to the position to which it is to be driven, incrementing the steps-taken counter by one count and resetting the step-delay counter. Thereafter, processing continuously loops through steps 608, 610, 808, 810 and 812 as hereinbefore discussed until the inquiry of step 810 is affirmatively answered. Whereupon a time-delay is implemented, step 814, to allow for settling the motion of the stepper motor 402 before the subroutine 800 is exited, step 816, by returning processing to the execute command step which originally called up the stepper motor drive subroutine 800, for example, step 710 (FIG. 23b).

After stepping the d.c. motor drive gear 124 to the rack select mode, step 710 (FIG. 23b) the d.c. motor is driven, step 714, to drive the transfer gears 430 and 432 (FIG. 1) for rotating the rack and digit selection members 472 and 478 to carry the pinion gear 476 into engagement with the desired rack 460. Step 714 (FIG. 23b) generally includes the step of calling up and executing the steps of the d.c. motor drive subroutine 900 (FIG. 23d).

The d.c. motor drive subroutine 900 (FIG. 23d), which is called up by the execute command routine 700 whenever the d.c. motor 120 is driven, includes the initial step 902 of fetching an amount, corresponding to the total number of counts the encoder 126 will count during the total desired displacement of a given portion of a load, e.g., the pinion gear 476, members 472 and 478, gears 484 and 486, or the encoded shafts 484a and 486a. Thus, step 902 includes the steps of identifying the type of load, stop 902b, which is being driven, i.e., the drum, tape feed, postage selection, or other load, and fetching the amount representing the desired number of encoder counts which are to be counted during displacement of the load portion. Thereafter the microprocessor 502 processes step 904 for the particular load. Step 904 includes the step 904a, of fetching the group or set of acceleration, deceleration and constant velocity constants from a look-up table, for the particular load being driven. Preferably the constants for each of the loads are specified with a view to maximizing the acceleration, deceleration and constant velocity of the d.c. motor for driving the particular load; the respective acceleration and deceleration constants being amounts which are representative of a number of counts per square sampling time period T, and the constant velocity constant being an amount which is representative of a number of counts per sampling time period T. In addition, step 904 includes the step 904b of utilizing the total desired displacement, and the acceleration, deceleration and constant velocity constants for computing the total displacement and time duration of the respective acceleration, deceleration and constant velocity phases for driving the particular load in accordance with a desired trapezoidal-shaped velocity versus time profile. Thereafter, processing proceeds to execution of the steps of the loop 906, including the initial steps of waiting for the next elapse of a sampling time period T, step 608 as previously discussed, then updating the d.c. motor drive servo control system, step 610 as previously discussed but excluding the assumption that the d.c. motor drive shaft 122 is to be located in its home position, then inquiring, step 908, as to whether or not the total displacement of the particular load is equal to the instantaneous desired position Pd. Assuming the inquiry of step 908 is negative, processing proceeds to the step, 910, of computing the desired position Pd for the next sampling time period T and thereafter continuously looping through steps 608, 610, 908 and 910 as hereinbefore discussed until the total desired displacement is equal to the instantaneous desired position, step 908. Whereupon processing is diverted to the step, 912, of implementing an appropriate time delay to allow for settling the motion of the d.c. motor 120 before the subroutine 900 is exited, step 916, by returning processing to the execute command step which originally called up the d.c. motor drive subroutine 900, for example, step 714 (FIG. 23b).

After executing step 714 (FIGS. 1 and 23b), of driving the pinion gear 476 into engagement with a selected rack 460, the select postage routine 702, executes the step, 716, of driving the stepper motor 402 to move the d.c. motor drive gear 124 into the digit select mode, wherein the gear 124 is disposed in engagement with the transfer gear 430. Step 716 generally includes the step of calling up the stepper motor drive subroutine 800 (FIG. 23c), executing the same as hereinbefore discussed and returning to step 716. Thereafter, the select postage routine 702 (FIG. 23b) executes the step, 718, of driving the d.c. motor 120 to rotate the digit selection member 478 for driving the pinion gear 476 to effectuate slidably moving the selected rack 460 for selecting the print element 465 which is to be printed. Step 718 generally includes the step of calling up the d.c. motor drive subroutine 900 (FIG. 23d) and executing the same as hereinbefore discussed before returning to step 718. Thereafter the inquiry is made, step 720, as to whether or not all the digits have been checked. Assuming all the digits have not been checked, processing loops to step 706, and steps 706–720 are continuously processed until the assumption is invalid. Whereupon processing proceeds to the step, 722, of driving the stepper motor 402 (FIG. 1) to move the drive gear 124 to its home position, wherein it is preferably disposed in a neutral mode of operation. Step 722 generally includes the step of calling up the stepper motor drive subroutine 800 (FIG. 23c), and executing the same as hereinbefore discussed before returning to step 722. Whereupon, the select postage routine 702 executes the step, 708, of transmitting an appropriate command execution complete message to the postage meter's computer 41 and processing is looped to idle 606 (FIG. 23a).

As above discussed, an appropriate time delay is implemented by the microprocessor 502 in the course of execution of each of the steps 710, 714, 716, 718 and 722 (FIG. 23b) to allow for settling movement of the stepper motor 402 or d.c. motor 120, depending upon which of the motors has been driven in the course of execution of the subroutine 800 or 900 (FIGS. 23c and 23d). In the case of the subroutine 800 the time delay is implemented by step 814, whereas in the case of the subroutine 900 the time delay is implemented by step 912. Each of the steps 814 and 912 generally includes the steps of calling up and executing the time delay subroutine 950 of FIG. 23e. As shown in FIG. 23e, the time delay subroutine 950 initially executes the step 952 of fetching an amount which is multiple of the sampling time period T, corresponds to the number of times processing is to loop in the time delay subroutine 950, and is preferably a different predetermined amount for the stepper motor 402 and d.c. motor 120 due to the respective motors having different settling time periods. Having executed step 952, the time delay subroutine 950 enters a loop 954 wherein the successive steps of waiting for the next elapse of the sampling time period T, step 608 as previously discussed, and then updating the d.c. motor servo-control drive system, step 610 as previously discussed, until the predetermined number of time delay loops have been completed. Whereupon processing is returned to the execute command step, for example, steps 710, 714, 716, 718 or 722, which originally called up the subroutine 800 or 900 as the case may be.

Having executed the select postage command 702 (FIG. 23b) and returned to idle 606 (FIG. 23a), processing continues through steps 608, 610, 612 and 614 as hereinbefore discussed, until a trip enable command has been received due to the operator depressing the start key 53a. Assuming the trip enable command is received, step 612 will be affirmatively answered and the command will be executed by the execute command routine 700 (FIG. 23b). The enable trip routine 726, includes the initial step of driving the step motor 420 (FIGS. 1 and 23b) to move the d.c. motor gear 124 to the drum drive mode step 728, wherein drive gear 124 is disposed in engagement with the transfer gear 90, in anticipation of feeding an envelope 16. Step 728 generally includes the step of calling up and executing the stepper motor drive subroutine 800 (FIG. 23c) including its subsidiary time delay routine 950 (FIG. 23e) before the routine 800 (FIG. 23c) returns processing to the call up step 728 (FIG. 23b). Whereupon step 730 is executed. Step 730 includes the steps of setting the trip enable status flag and energizing the solid state A.C. relay 52 (FIG. 2) to start the A.C. motor 50 for feeding envelopes 16 past the sensors 56 and 58 to the drum 38. Whereupon the appropriate command execution complete message is transmitted to the postage meter's computer 41, processing returns to idle 606 (FIG. 23a), and, upon the next elapse of a sampling time period, step 608, in the course of execution of the step of updating the d.c. motor servo-control drive system, step 610, since the trip logic enabled status flag was set in the course of execution of the enable trip command, the envelope sensors are poled, step 610h. At this juncture, assuming another command is not received for execution, the inquiry of step 612 will be answered in the negative, and processing diverted to step 614 which will be affirmatively answered since trip logic is enabled. Step 614 is followed by the step of inquiring as to whether or not the envelope sensing sequence is complete, step 616, which is in effect an inquiry as to whether or not the sensors 56 and 58 have completed successively sensing the leading edge of an envelope 16 as it is being fed to the drum 38. Assuming the sensing sequence is incomplete, step 616, processing is diverted to an inquiry as to whether or not an envelope is available. Assuming an available envelope, processing loops to idle 606, and step 608, 610, 614 616 and 618 are continuously processed until the sensing sequence, step 616 is complete. Whereupon processing proceeds to the step 620, wherein the microprocessor 502 generates a cycle drum command, and then calls up the execute command routine 700. On the other hand, if an envelope is not available, step 618, processing advances to step 622, wherein the microprocessor 502 generates a disable trip command and then calls up the execute command routine 700.

Assuming an envelope is not available and a disable trip command has been generated, step 622 (FIG. 23a), the microprocessor 502 implements the disable trip command routine, 740 (FIG. 23b) which commences with step 722, as previously discussed, wherein the stepper motor is driven to move the d.c. motor drive gear to its neutral mode, and then implements the step, 742, of clearing the trip enable status flag and deenergizing the solid state A.C. relay 52 to stop the A.C. motor 50 from feeding envelopes. Whereupon an appropriate command execution complete message is transmitted to the postage meter's computer 41 and processing is returned to idle 606 (FIG. 23a) where idle loop processing continues, with step 614 being answered negatively due to the trip enable status flag having been cleared, until a subsequent command is received from the postage meter's computer 41 as hereinbefore discussed.

Assuming however that an envelope is available, the envelope sensing sequence is eventually completed, the cycle drum command is generated, step 620 (FIG. 23a) and the microprocessor 502 implements the drum cycle command routine 750. The routine 750 commences with the step, 752, of calculating the envelope velocity V1 and the time delay td, thereafter the time delay td is implemented, step 754, and the D.C. motor is driven for cycling the drum to feed the envelope. As with the other d.c. motor drive steps, step 754 includes the step of calling up the d.c. motor drive subroutine 900 and implementing the same, including implementing the time delay subroutine 950, before returning processing to the call up step 756 (FIG. 23b). Thereafter, an appropriate command execution complete message is transmitted to the postage meters computer 41, step 708, and processing returns to idle, step 606.

Having returned processing to idle 606 (FIG. 23a), steps 608, 610, 612 and 614 are again continously processed until another command is received, step 612. Whereupon the command is executed, step 700. Assuming the command to be executed is to print on tape, 760 (FIG. 23b), the microprocessor 502 executes the series of steps involving alternately driving the stepper motor to the appropriate mode of operation and driving the d.c. motor, which steps have been discussed in detail in connection with the other commands. Accordingly, there follows a less detailed discussion of steps in the process of implementing the print on tape command routine 760. The steps of the routine 760 include those of driving the step motor to move the d.c. motor gear to the tape drive mode, step 762, wherein the gear 124 is disposed in engagement with the transfer gear 434; then driving the d.c. motor to feed tape into the path of travel of the drum, step 764; then driving the stepper motor to move the d.c. motor drive gear to the drum drive mode 768; then cycling the drum, followed by operating the tape cutting solenoid, step 772; then driving the step motor to move the D.C. motor drive gear back to the tape drive mode; then driving the d.c. motor to feed the tape (less the cut-off portion thereof) out of the feed path of the drum; then implementing step 722, of driving the step motor to move the d.c. motor drive gear to its home position, e.g., preferably a neutral mode of operation; and then transmitting to the postage meter's computer 41a an appropriate command execution complete message, step 708, before returning to idle 606 (FIG. 23a).

The term postage meter as used herein includes any device for affixing a value or other indicia on a sheet or sheet like material for governmental or private carrier parcel, envelope or package delivery, or other purposes. For example, private parcel or freight services purchase and employ postage meters for providing unit value pricing on tape for application on individual parcels.

A more detailed description of the programs hereinbefore discussed is disclosed in the appended program listing which describes in greater detail the various routines incorporated in, and used in the operation of, the postage meter.

Although the invention disclosed herein has been described with reference to a simple embodiment thereof, variations and modifications may be made therein by persons skilled in the art without departing from the spirit and scope of the invention. Accordingly, it is intended that the following claims cover the disclosed invention and such variations and modifications thereof as fall within the true spirit and scope of the invention.

What is claimed is:

1. In a machine including a system for controlling tape feeding means, wherein the system includes means for driving the tape feeding means, an improvement in the system for controlling the tape feeding means, the improvement comprising:
   (a) the driving means including a d.c. motor having an output shaft for driving the tape feeding means;
   (b) means for sensing respective increments of actual angular displacement of the motor output shaft;
   (c) means responsive to the sensing means for counting the respective increments;
   (d) microcomputer means including a microprocessor coupled to the counting means and comprising
      i. clock means for generating successive sampling time periods,
      ii. means for providing first counts respectively representative of successive desired angular displacements of the motor output shaft during successive sampling time periods,
      iii. means for providing second counts respectively representative of actual angular displacements of the motor output shaft during successive sampling time periods, and
      iv. means for compensating for the difference between the first and second counts during each successive sampling time period and generating a pulse width modulated control signal for controlling the d.c. motor, the motor control signal causing the actual angular displacement of the motor output shaft to substantially match the desired angular displacement of the motor output shaft during successive sampling time periods; and
   (e) signal amplifying means for operably coupling the motor control signal to the d.c. motor.

2. The improvement according to claim 1, wherein the sensing means comprises analog to digital signal converting means coupled to the motor output shaft.

3. The improvement according to claim 1, wherein the sensing means comprises means for sensing the direction of angular displacement of the motor output shaft.

4. The improvement according to claim 1, wherein the microcomputer means includes said counting means.

5. The improvement according to claim 1, including the microprocessor programmed for responding to an input signal representative of desired linear displacements of an element of the tape feeding means during successive sampling time periods.

6. The improvement according to claim 1, wherein the microprocessor includes means for comparing first and second counts and generating an error signal representative of the difference, said motor control signal comprising a function of the error signal and a previous error signal, and said motor control signal comprising a function of a previously generated motor control signal.

7. The improvement according to claim 1, wherein the compensation means includes means for implementing calculation of a recursive mathematical expression.

8. The improvement according to claim 1, wherein the microprocessor includes counting means for generating the motor control signal.

9. The improvement according to claim 1, wherein the compensation means includes means for compensating for d.c. motor start-up torque due to a load.

10. The improvement according to claim 1, wherein the compensation means includes means for calculating in advance of each sampling time period a portion of the motor control signal for use in generating the motor control signal during the sampling time period, whereby the motor control signal may be generated in a lesser time interval during the sampling time period.

11. The improvement according to claim 1, wherein each of the first counts comprises an amount representative of a desired increment of linear displacement of an element of the tape feeding means during a sampling time period.

12. The improvement according to claim 1, wherein the sensing means comprises quadrature encoder means coupled to the motor output shaft.

13. The improvement according to claim 1, wherein the means for providing first counts includes means for calculating respective first counts, and said calculating means including acceleration and deceleration and constant velocity constants stored in the microprocessor.

14. The improvement according to claim 1, wherein the microprocessor includes at least one set of values each of which is representative of a different desired trapezoidal-shaped velocity versus time profile of cyclical motion of a predetermined element of the tape feeding means.

15. The improvement according to claim 1, wherein the tape feeding means includes tape cutting means, the tape cutting means includes a knife and a solenoid operably coupled to the knife, the microcomputer means includes means for coupling the microprocessor to the solenoid, and the microprocessor includes means programmed for controlling the solenoid to timely cause the knife to cut tape fed by the tape feeding means.

16. The improvement according to claim 1, wherein the tape feeding means has a predetermined element, and the motor control signal controlling linear displacement of the element during successive sampling time periods to follow a desired trapezoidal-shaped velocity versus time profile.

17. In a machine including a system for controlling tape feeding means, a process for controlling the velocity of a predetermined element of the tape feeding means in accordance with a desired velocity versus time profile, the process comprising:
- (a) providing a d.c. motor having an output shaft for driving the tape feeding means;
- (b) providing counts representative of respective desired angular displacements of the shaft during successive sampling time periods to cause a predetermined element of the tape feeding means to be moved in accordance with a desired velocity versus time profile;
- (c) sensing angular displacement of the shaft and in response thereto providing counts representative of respective actual angular displacements of the shaft during successive sampling time periods; and
- (d) digitally compensating for the difference between desired and actual counts and generating a motor control signal for controlling rotation of the shaft to cause the actual angular displacement of the shaft to substantially match the desired displacement thereof, whereby the element of the tape feeding means is moved substantially in accordance with the desired velocity versus time profile.

18. The process according to claim 17, wherein step (b) includes the step of computing said counts.

19. The process according to claim 17, wherein step (c) includes the step of sensing the direction of angular displacement of the d.c. motor.

20. The process according to claim 17, wherein step (d) includes the steps of:
1. comparing counts representative of respective desired and actual angular displacements,
2. generating an error signal representative of the difference between respective desired and actual counts and in response thereto generating a motor control signal which compensates for the difference between said desired and actual angular displacements.

21. The process according to claim 17, wherein step (c) includes the step of calculating a count representative of the total desired displacement of the shaft for causing the element of the tape feeding means to follow the desired trapezoidal-shaped profile.

22. The process according to claim 17, wherein step (d) includes the step of calculating the motor control signal from a function of a recursive mathematical expression.

23. The process according to claim 17, wherein step (b) includes the step of generating respective counts representative of desired angular displacements of the shaft.

24. The process according to claim 17, wherein step (d) includes the step of generating respective counts representative of actual angular displacements of the shaft.

25. The process according to claim 17, wherein step (d) includes the steps of:
1. generating a pulse width modulated motor control signal,
2. amplifying said pulse width modulated control signal, and
3. applying the amplified pulse width modulated control signal to said D.C. motor.

26. The process according to claim 21, wherein step (b) includes the step of calculating a first plurality of counts respectively representative of successive desired increments of angular displacement of the shaft during successive sampling time periods, step (c) includes the step of sampling a second plurality of counts respectively representative of successive actual increments of angular displacement of the shaft during successive sampling time periods, and step (d) includes the step of digitally calculating a compensated difference between the corresponding first and second counts during successive sampling time periods.

* * * * *